United States Patent [19]
Brichard

[11] 3,775,080
[45] Nov. 27, 1973

[54] METHOD AND APPARATUS FOR CONTROLLING GAS FLOWS ALONG A DRAWN RIBBON OF GLASS

[75] Inventor: Claude Brichard, Moustier/S/Sambre, Belgium

[73] Assignee: Glaverbel S. A.,, Watermael-Boitsfort, Belgium

[22] Filed: July 14, 1972

[21] Appl. No.: 271,758

[30] Foreign Application Priority Data
Aug. 20, 1971 Luxembourg.......................... 63755
July 5, 1972 Great Britain.................... 31,485/72

[52] U.S. Cl.......................... 65/95, 65/194, 65/197, 65/204
[51] Int. Cl............................................ C03b 15/12
[58] Field of Search................ 65/95, 96, 193, 194, 65/196, 197, 198, 203, 204

[56] References Cited
UNITED STATES PATENTS
2,849,837  9/1958  Thum et al. .......................... 65/203
2,928,213  3/1960  Crandon, Jr. .......................... 65/194
3,206,293  9/1965  Atkeson........................... 65/204 X
3,232,733  2/1965  Ward.................................... 65/193

FOREIGN PATENTS OR APPLICATIONS
863,251  2/1971  Canada................................. 65/203

Primary Examiner—Arthur D. Kellogg
Attorney—George H. Spencer et al.

[57] ABSTRACT

To improve the thermal conditions to which a glass ribbon is exposed while being drawn upwardly along a path through a drawing chamber and annealing lehr from a molten glass bath, gases along the path and at one side of the ribbon are displaced across the path and parallel to the ribbon in respectively opposite directions from a pair of respective locations spaced apart along the path, the spacing between the locations being such that the viscosity of the glass in the ribbon changes by no more than $10^{2.5}$ poises while traveling therebetween and the viscosity of the glass at one location being between $10^{7.6}$ poises and $10^{13}$ poises.

36 Claims, 14 Drawing Figures

METHOD AND APPARATUS FOR CONTROLLING GAS FLOWS ALONG A DRAWN RIBBON OF GLASS

BACKGROUND OF THE INVENTION

This invention relates to a process of manufacturing sheet glass by supplying molten glass to a drawing zone and drawing glass from that zone as a continuous ribbon which is guided through zones in which the glass sets and cools. The invention also relates to apparatus for use in manufacturing sheet glass by this process and to glass manufactured thereby.

There are various known processes for manufacturing sheet glass by drawing a ribbon of molten glass from a drawing zone to which molten glass is supplied. In some of these processes the ribbon is drawn from the surface of a quantity of molten glass flowing to the drawing zone. An example of such a process is the classic Pittsburgh process in which the molten glass which flows into the ribbon is derived from the upper levels of a bath of molten glass. Another example of such a process is the classic Libbey-Owens or Colburn process in which molten glass flows into the ribbon from the full depth of a relatively shallow bath.

Surface-drawing processes are not confined to the classic ones which have been specifically mentioned. For example it is known to draw the ribbon from a supply of molten glass which is fed to the drawing zone while floating on a bath or layer of molten material, e.g. a molten metal, of higher specific gravity, acting as a lubricant between the molten glass and the sole of a refractory kiln in which the molten materials are held. As another example of a special type of surface-drawing process, the ribbon of glass, instead of being drawn via a meniscus formed at a free fluid surface of the supply of molten glass, may be drawn from a meniscus which is cooled to prevent flow of molten glass beyond the location of the meniscus as, e.g. is described in United Kingdom Pat. specification No. 988,128.

Although they are not as important for the purpose of introducing the present invention, mention is also made of processes in which the ribbon of molten glass is extruded from beneath the surface of the supply of molten glass. The most notable process of this kind is the classic Fourcault process in which the molten glass is extruded upwardly through a slot in a so-called debiteuse which is partly immersed in the quantity of molten glass which flows to the drawing zone. Such extrusion processes are in many ways radically different from the surface-drawing processes and require for their satisfactory performance a body of practical knowledge which cannot be gained from experience with surface-drawing processes. Although the present invention can be applied with advantage in such extrusion-type processes, it is emphasized that the invention is of appreciably greater advantage in surface-drawing processes due to the different thermal and rheological conditions which prevail in such processes.

In all of the known processes of drawing sheet glass the ribbon of molten glass is drawn from the drawing zone through a drawing chamber in which the ribbon becomes dimensionally set and the ribbon is led on through a shaft, or lehr, in which the ribbon progressively cools preparatory to being cut into sections. The shaft, which is known as an annealing shaft, can be a vertical shaft surmounting the drawing chamber, as for example in the classic Pittsburgh process. Alternatively the shaft can be a horizontal shaft into which the ribbon passes after being bent about a bending roll. A horizontal shaft is used in the classic Libby-Owens process. Of course the classic processes are subject to many variations and a given process can embody features derived from classic processes of different types. To take one example, a horizontal shaft is used in certain processes in which the ribbon is drawn from a bath of molten glass of appreciable depth as in the classic Pittsburgh process but is bent about a bending roll as in a classic Libby-Owens process.

In all known glass drawing processes the glass ribbon is exposed to the influence of environmental gas currents which exert on the ribbon a cooling action which is irregular in both time and space. These currents are due to various causes. Due to the interconnection of the drawing chamber and the annealing shaft, the shaft has a chimney effect, causing a system of natural draft currents to propagate through the drawing chamber and the annealing shaft. Hot gas currents flow upwardly along the central region of the ribbon from the intensely hot drawing zone, through the drawing chamber and into the annealing shaft and cooler currents of gases flow back into the drawing chamber from the annealing shaft along the walls of the apparatus. The chimney effect is very marked when the annealing shaft is vertical. The chimney effect is however also a very important factor in the classic Libbey-Owens or Colburn process and in other processes using a horizontal annealing shaft.

The rising currents of hot gas caused by the chimney effect increase in temperature and velocity during their movement through the drawing chamber and give rise to turbulence in the upper part of the chamber. There is an interaction between these turbulent currents and the natural draft currents which flow from the drawing chamber into the annealing shaft, and vice versa. This interaction gives rise to a complex system of currents which also plays a part in creating adverse heat distribution across the ribbon.

Some of the cooler gas flowing back into the drawing chamber from the annealing shaft tends to flow down within the drawing chamber along the walls thereof and then, as it becomes heated, to flow inwardly along generally upwardly inclined paths to join the main upward convection current of gas along the central longitudinal portion of the ribbon path. In the course of such flow some of this cooler gas sweeps across the marginal zones of the ribbon path and this also gives rise to adverse conditions.

Another cause of thermal heterogeneities in the environmental conditions is the leakage of currents of ambient air into the drawing chamber through cracks in the refractory walls or via imperfectly sealed joints between such walls and components which extend through such walls into the drawing chamber.

Yet another cause of troublesome environmental gas currents is the cooler or coolers often provided in the drawing chamber. It is usual for a cooler to be located on one or each side of the glass ribbon, at a level quite close to its origin, in order to accelerate the cooling of the ribbon as it is drawn from the supply of molten glass. The gases cooled by such coolers tend to fall down onto the molten glass at the drawing zone and to influence the distribution of heat in the main upward currents caused by the chimney effect. It is difficult to eliminate temperature differences in such descending cooled gases as between one region and another across the ribbon width. Any irregularities in the cooling action of these gases is of course liable to have seriously adverse effects on the drawn glass ribbon because they play upon its surface in a region where the glass is at very low viscosity.

In some processes one or more additional coolers are provided at a higher level in the drawing chamber. Any such additional cooler further increases the rate of cooling of the glass ribbon but the influence of such a cooler on the pattern of convection currents set up in the drawing chamber is quite different from that of a cooler located near the ribbon source. Thermally heterogeneous gas currents at such higher level have their own peculiar effect on the ribbon due to the characteristic flow pattern and velocities of such currents and on the condition of the ribbon surfaces at that higher region of the drawing chamber.

It is well known that the irregular cooling action of environmental gas currents is the cause of defects in the geometry of the drawn sheet glass. More particularly, the irregular cooling action prevents the drawing of sheet glass with faces which are truly flat and parallel at all locations. Due to the lack of true flatness and parallelism of the sheet faces, the sheet glass causes angular deflections of light waves travelling through the glass so that objects viewed through the glass under certain conditions appear distorted.

These defects in the drawn sheet glass are of various kinds. Some defects are in the form of waves running more or less parallel to the line of draw of the glass. These defects are mainly caused by the effect of the cool air falling from the cooler or coolers located near the origin of the ribbon as described above. The wave defects are quite apparent when viewing objects at a shallow angle through the sheet glass in a plane normal to the line of draw, particularly if the viewer should move so as to progressively shift the viewing angle.

Another kind of defect is known as "martelage" or "hammering." This kind of defect takes the form of haphazard distribution of shallow surface depressions usually measuring from 1 to 4 cm across. These defects, which are mainly caused by the effect of the additional cooler or coolers located at a higher level in the drawing chamber, are normally less apparent than waves, but are nevertheless also apparent to ordinary observation due to their distorting effect on objects viewed through the glass at shallow angles to the sheet.

Yet another kind of defect appears as intersecting series of diagonal and vertical lines, predominently in outer portions of the ribbon width, with the diagonal lines running upwardly away from the side margins towards the central region of the ribbon. This kind of defect is attributable, inter alia, to the movement along upwardly inclined paths within the drawing chamber, across the marginal portions of the ribbon, of some of the gases which flow back along the walls of such chamber from the annealing shaft, and to the aforementioned leakage currents of cooler air into the drawing chamber through its walls.

In many cases, drawn sheet glass exhibits defects which in a shadow-graph appear as dark stripes of limited length. These defects, hereinafter called "dark stripes," are elongated shallow surface depressions. Unlike waves, these defects are not continuous along the length of the ribbon, but they are much larger in extent than hammering marks and sometimes have a length of up to 50 cm or more. These dark stripes are not normally apparent to ordinary observation but, unless they are masked by more serious defects, they are apparent when light rays are projected through the sheet glass, at shallow angles of less than 15° to the sheet, onto a light-diffusing screen.

The presence of surface defects in the form of waves necessarily involves minute local variations in the thickness of the sheet glass from one place to another, but sheet glass also exhibits general and larger variations in thickness. These general variations are not attributable to surface defects but to differences between the quantities of molten glass drawn from the supply of molten glass into different parts of the ribbon width due to viscosity variations. In the case where the ribbon surfaces are marred by waves, the general thickness variations involve differences in the mean thickness of the sheet measured at different regions across the sheet.

The desire to approach further towards the ideal of producing drawn sheet glass which is quite free from optical defects has stimulated much research in the sheet glass manufacturing industry into ways of creating a more favorable heat distribution in the environment through which the ribbon is drawn and cooled. As a result, many proposals have been made with a view to establishing a predictable and more favorable temperature profile across the glass ribbon path at a region where the glass composing the ribbon has a very low viscosity and is most susceptible to deformation under the influence of local temperature variations. These proposals have been in effect to create gaseous currents of predetermined temperature and velocity characteristics in the lower portion of the drawing chamber to replace the randomly distributed cooling action of the various convection currents, or alternatively to act on such convection currents in the lower portion of the drawing chamber to modify their distribution across the ribbon path.

In practice some of these hitherto proposed measures have been found to be capable of improving the optical qualities of the sheet glass, notably by avoiding or reducing the occurrence of waves. However, notwithstanding attempts to develop and refine these corrective measures the sheet glass is still marred by certain finer surface defects which, although they do not impair the optical quality of the sheet glass to the same extent as waves, nevertheless do give rise to optical distortion and make the sheet glass unsuitable for use in situations which call for glass having very high optical qualities. The finer defects here referred to are the above-described "dark stripes." These defects have been found to persist even though the known corrective meaures for avoiding cooling irregularities are taken. Thus it is that, in the present state of the art, a process has yet to be found by which sheet glass which has flat surfaces and is of uniform thickness, and which is otherwise of optimum optical quality, can be drawn with consistant reliability.

SUMMARY OF THE INVENTION

It is an object of the present invention to provide another form of corrective measure which influences the conditions to which the surfaces of the drawn glass ribbon are exposed so as to make possible a further improvement in the achievable quality of sheet glass.

In particular the invention aims to avoid or reduce the incidence of dark stripes.

According to the present invention, a process of manufacturing sheet glass by supplying molten glass to a drawing zone and drawing glass from that zone as a continuous ribbon which is guided through zones in which the glass sets and cools, includes exerting at a first one of a pair of successive locations along the ribbon path, a gas-displacing force which causes gases in the environment of the ribbon to move in one direction across the ribbon on one side thereof, and, at the other one of the pair of locations, a gas-displacing force which causes gases in such environment to simultaneously move in the reverse direction across the ribbon on that same side, the locations being spaced apart along the ribbon path by a distance such that the difference in the viscosities of the glass at the two locations is not more than $10^{2.5}$ poises, and at at least one of such locations the viscosity of the glass is not less than $10^{7.6}$ poises and not more than $10^{13}$ poises.

It has been found that when such gas displacements are brought about they have a considerable beneficial effect on the surface quality of the sheet glass. In effect, such displacements have been found to avoid or reduce the occurrence of dark stripes, which have persisted despite the employment of the previously known corrective measures. This result, attainable by the invention is surprising.

It is understandable that hitherto, when attempting to improve the gaseous environment through which the glass is drawn, attention should have been confined to those regions of the ribbon path where the viscosity of the glass is very low. In most glass drawing processes, the viscosity of the glass in the region of critical formation of the ribbon in the lower part of the drawing chamber is very substantially lower than $10^{7.6}$ poises. As distinct from the previously proposed corrective measures, which are concerned with phenomena occurring in the regions where the ribbon glass is hottest, the present invention involves acting on the environment of the ribbon at a different stage in its progress. In many embodiments of the invention this action is taken, as will hereafter be exemplified, actually within the annealing shaft.

The results achieved by the present invention give rise to the supposition that the troublesome dark stripes which have hitherto proved impossible to avoid may be due partly, or even mainly, to effects of the complex system of gas currents which is set up in the upper part of the drawing chamber due to the interaction of turbulent and natural draft currents. However, the precise reasons for the successful results of the invention are not known with any certainty.

A further advantage of the invention is that, as the occurrence of the dark stripes is generally more in evidence at higher drawing speeds, the employment of a process according to the invention in a given drawing machine affords the advantage, other conditions being equal, that sheet glass of a given quality can be produced at a faster rate.

It has been found to be necessary for gas-displacing forces acting in different directions across the ribbon to be exerted at places which are spaced along the ribbon path by a distance which is not greater than that represented by the specified viscosity internal of $10^{2.5}$ poises in order that the gas displacements caused by such forces shall in all cases have the beneficial effects on the quality of the glass which have been referred to. This is probably due to the fact that each of the successive regions along the glass ribbon, after having been exposed to the influence of gases moving across the ribbon in one direction, is then exposed to the influence of gases moving in the reverse direction across the ribbon before the glass in that region of the ribbon has undergone significant cooling.

It is undoubtedly the case that if a constant gas-displacing force is exerted continuously in one direction across the ribbon path, and there is no displacement of gases in the reverse direction across the ribbon path in an adjacent zone along such path, the same improvement in quality does not ensue. The exertion of a continuous and constant gas-displacing force across the ribbon path in one direction and at one isolated zone appears to result in a modified but nevertheless steady state of convection currents along the ribbon and the reoccurrence of adverse temperature gradients from one location to another across the ribbon path. By contrast, the present invention eliminates such adverse temperature gradients, even if the gas-displacing forces are of constant magnitude and are continuously exerted.

In stating that the forces exerted at the different locations of a pair of locations cause displacements of gases in one direction and in the reverse direction across the ribbon, this does not mean that the lines of action of the oppositely directed forces are necessarily truly parallel. What is meant is that the force exerted at one location of the pair is exerted in a direction away from one margin and towards the opposite margin of the ribbon path and that the force exerted at the other location of the pair is exerted in a direction away from such opposite margin and towards the one margin of the ribbon path.

Preferably at at least one location of the pair of locations the viscosity of the glass is not less than $10^{10}$ poises. The invention is in that case particularly effective in preventing the occurrence of dark stripes.

In certain embodiments of the invention, the ribbon of glass is cooled while passing upwardly through a vertical annealing shaft the cross section of which is locally reduced at the bottom to define an entry slot for the ribbon, and at least one of the locations of the pair is in the entry slot. It has been found that the occurrence of dark stripes can most readily be prevented by observing that condition. This is probably due to the fact that the natural draft currents which play a part in creating the complex system of gas currents in the immediately adjacent part of the drawing chamber, by interacting with the turbulent currents therein, have a high velocity in the entry slot due to the restricted cross-sectional dimensions of the gas flow paths at that point.

The invention also includes processes in which the ribbon of glass is cooled while passing upwardly through a vertical annealing shaft the cross section of which is locally reduced at the bottom to define an entry slot for the ribbon and in which at least one location of the pair is in the vertical shaft. The exertion of gas-displacing forces at such a pair of locations is very effective for countering the formation of dark stripes if the pair of locations is such that at least one of them is in the vertical annealing shaft. This is probably due to the fact that the velocities of the natural draft currents in contact with the glass, although not so great as in the entry slot, are also appreciable, and certainly greater than in the drawing chamber.

It is still essential, when gas-displacing force is exerted in the vertical shaft, for at least one location of the pair of locations at which the gas-displacing forces are exerted to be where the glass is in the viscosity range of $10^{7.6}$ to $10^{8}$ poises. It is of course permissible and advantageous for one or each location of the pair to be in the entry slot and for the other location of that pair, or at least one location of another pair, to be within the annealing shaft.

When the invention is employed in a process wherein the ribbon of glass is bent over a bending roller preparatory to being advanced through a horizontal annealing shaft, it is preferable for at least one location of a pair of locations at which gas-displacing forces are exerted to be downstream of the bending roller along the ribbon path, i.e., within the annealing shaft or, if space permits, between the bending roller and the entrance to such shaft. The best results in terms of the absence of dark stripes from resulting drawn sheet glass are achieved when that condition is observed. This may well be due to the facts that the region immediately in front of the entrance to the annealing shaft is the region of formation of the complex system of gas currents resulting from the interaction of natural draft and turbulent currents, and the natural draft currents which help to create that complex system have quite a high velocity in the shaft.

Advantageously, gases which have been displaced in one direction across the ribbon, by force exerted at one or each location of a pair of locations, flow within the free environment of the ribbon to a location from which they become displaced in the reverse direction across the ribbon by force exerted at the other location of such pair. Such a flow of gases will normally occur if there is an unobstructed path for the flow of gases from one to the other of the zones where displacement of the gases across the ribbon takes place. Such flow has a beneficial effect in promoting a better heat distribution at the place or places where such flow of gases from one such zone to the other takes place. The place or places are preferably in the vicinity of the one edge margin or in the vicinity of the opposed edge margins of the ribbon path.

In certain processes according to the invention, gases which have been displaced in one direction across the ribbon by force exerted at one or each location of a pair of locations are positively guided to a point from which they become displaced in the reverse direction across the ribbon by force exerted at the other location of such pair. This positive guidance is conducive to the attainment of a predetermined influence of the environmental conditions by controlling the movement of the gases after their movement across the ribbon path.

Such positive guidance of gases flowing from one zone to another of the zones influenced by the gas-displacing forces can be a positive guidance along at least one path located in the interior of an annealing shaft or of an annealing shaft and drawing chamber through which the ribbon is drawn. Thus, the gases may be caused to circulate wholly within the interior of the drawing machine. Alternatively, the gases may be guided from one to the other of the zones along a path or paths extending through a region at the exterior of the drawing machine and in the latter case a conditioning treatment, e.g., a thermal treatment, can be performed on the gases while they move through the exterior region.

It is not essential for the gas-displacing forces exerted at a pair of locations to cause displacements of gases over the full width of the ribbon because if the gas displacements are confined to only a part of the ribbon width there will be an improvement in the quality of the glass over that part and that in itself is of real value, particularly since the ribbon, usually has to be eventually cut into pieces some of which will derive from the higher quality regions of the ribbon. However, it is preferable for the gas displacements to be brougth about substantially over the full width of the ribbon so that the improvement in quality is achieved for substantially the entire drawn sheet.

For achieving the best gas flow conditions across the ribbon the gas-displacing forces should be exerted substantially parallel to the faces of the ribbon. It is also an advantage for the gas-displacing forces to be exerted in directions which are substantially normal to the direction of the ribbon.

The invention includes processes in which there is at least one such pair of locations one of which is in the vicinity of one edge margin of the ribbon and the other of which is in the vicinity of the opposite edge margin of the ribbon. In that case the requisite gas displacements can be brought about by propulsion forces at the two locations of such pair. By propulsion forces, the gas-displacements can easily be effected in well-defined directions.

In certain embodiments of the invention there is a pair of locations which are in the vicinity of one and the same edge margin of the ribbon and opposite to such pair there is another pair of locations which are in the vicinity of the opposite edge margin of the ribbon. The forces acting at the pairs of locations cooperate to bring about such displacements of gases across the ribbon. The exertion of forces at two pairs of locations having such a relationship to each other and to the ribbon is recommended for achieving displacements of gases across the whole or substantially the whole width of the ribbon path at fairly well defined zones therealong. Moreover, by exerting the forces at two such pairs of locations, the gaseous environment over the whole width of the ribbon can be influenced while exerting forces of quite low magnitude, which is desirable for avoiding undesirable turbulence conditions.

It will be appreciated that the gas-displacements required by the invention must be brought about without introducing a fresh cause of an adverse heat distribution such as would offset the advantages of producing the displacements of gases according to the invention. It is permissible for the gas-displacements to be brought about in a way which involves the supplying of heat or cold to the environment of the ribbon, provided that an adverse heat distribution is avoided. Nevertheless, in preferred embodiments of the invention the displacements of gases across the ribbon are brought about substantially without increasing the rate of cooling of the glass ribbon. It is a very important advantage that the invention enables an improvement in the surface quality of the sheet glass to be achieved in a given process and a given plant without any modification of the cooling rate of the glass ribbon. This cooling rate can accordingly be determined entirely by other factors as in normal practice.

In certain embodiments of the invention, the pair or pairs of locations at which the gas-displacing forces are exerted are such that the displacements of gases across the ribbon occur only on one side thereof.

The main advantage of exerting the forces at one side only of the ribbon is that the forces can be made to influence environmental conditions only, or primarily, on one side of the ribbon. This is sometimes of importance, for example in processes in which there is a difference between the natural environmental conditions on the opposite sides of the ribbon such that one face of the ribbon is normally more prone to be spoiled by dark stripes than the other. Such a difference is often particularly in evidence in processes in which the ribbon is bent about a bending roller preparatory to entering a horizontal annealing shaft. When applying the invention in a classic Pittsburgh type drawing process it will often be found more beneficial to exert the gas displacing forces at the rear side of the ribbon, i.e., the side facing towards the rear end of the drawing tank, whereas in a classic Libby-Owens type process the front side of the ribbon, i.e., the side which contacts the bending roller, is the one which is usually of lower quality and which would most benefit from the specified displacements of gases across the ribbon path. Of course, gas displacing forces can be exerted at at least one pair of locations on each side of the ribbon, if so required.

The invention includes processes in which there is at least one pair of locations at which gas displacing forces are exerted continuously. In such cases there is no need to provide special timing means for controlling the force exertions.

The invention also includes processes in which there is at least one pair of locations at which the gas-displacing forces are exerted periodically. Although timing means for controlling the force exertions is required in such processes, the periodic exertion of the forces can in some cases be a particularly effective way of achieving the required disturbance of the normal pattern of gas currents at the region where the forces are exerted.

In important embodiments of the invention there is at least one pair of locations at which gas-displacing forces exerted periodically but at a frequency such that a steady state of the gas currents along the ribbon path does not become established or does not become established for sufficiently long a period for the glass to be adversely affected thereby.

The existence of such a steady state implies the existence or risk, of an adverse disparity in temperature between adjacent regions across the ribbon, for reasons which have already been described. If any given zone along the glass ribbon is exposed to such conditions for longer than a certain period of time, which depends on the viscosity of the glass in that zone, the surface of the glass is liable to be adversely affected. A steady state of the natural draft gas currents can be tolerated for a greater length of time in zones along the ribbon path where the glass ribbon has a relatively high viscosity, e.g. a viscosity of the order if 10$^1$poises, than in zones where the glass viscosity is much lower.

Advantageously, there is at least one pair of locations along the ribbon path at which the gas displacing forces are exerted periodically and in alternation with forces which act across the same zones along the ribbon path and which reverse the direction of displacement of gases across the ribbon in each of such zones. Such an action produces to-and-fro movement of gases across the ribbon in each of a pair of zones, which is conducive to the drawing of glass which is substantially free of traces of dark stripes.

According to another preferred feature which is applicable when gas-displacing forces are exerted which periodically reverse the direction of displacement of gases across the ribbon path at each of a pair of zones, the exertion of the forces which reverse the directions of displacement of gases at the zones are timed immediately to follow or to coincide with the relaxation of the forces acting in the other directions across such zones. The advantage of this feature is that a continuous to-and-fro motion of the gases is produced.

In certain embodiments of the present invention where there is a periodic reversal in the direction of displacement of gases across the ribbon in a pair of zones, there are zones in which a reversal of the directions of displacement of gases across the ribbon takes place at least once every ten minutes. Empirical data show that this is the most suitable frequency range, taking into account energy consumption and the need to prevent a normal pattern of natural draft currents from becoming established.

Particular importance is attached to processes according to the invention wherein at at least one location of a pair of locations a gas-displacing force is exerted by blowing gas into the environment of the ribbon at that location. It is an important advantage of this mode of exerting a gas-displacing force that there is no need to provide moving parts in the vicinity of the ribbon where they would be exposed to the high temperature conditions there prevailing. Another important advantage is the fact that by blowing gas into the environment of the ribbon the gas-displacing force can be exerted in a well-defined direction.

In a particularly satisfactory embodiment of the invention, there are two pairs of locations at which forces are exerted which cooperate to cause displacement of gases in one direction across the ribbon in one zone and displacement of gases in a reverse direction across the ribbon in another zone, the forces at one of such pairs of locations being exerted by blowing gas into the environment of the ribbon and the forces at the other of such pairs of locations being suction forces. Such a system has proved to be capable of achieving the object of the invention in a very efficient manner.

The invention includes processes in which in at least one location of a pair of locations a gas-displacing force is exerted by mechanical means acting directly on the gaseous environment of the ribbon. Although in this mode of operation it is necessary to install a moving part or parts in the vicinity of the ribbon, there is the advantage that the gas-displacing forces are exerted without altering the composition of the environment by introducing further quantities of gas. Consequently it is an easy matter to avoid undesirable disturbance of the ribbon cooling schedule and there is no risk of introducing undesirable substances into the atmosphere in contact with the ribbon.

When carrying out the invention additional measures can be taken for avoiding or reducing the occurrence of waves in the surface of the glass ribbon. Various corrective measures for this purpose are known per se and have already been referred to. However a particularly effective method of countering wave formation resides in the displacement of gases across the ribbon path at a zone or zones where the ribbon has a very low viscosity. In certain processes according to the invention, in addition to the exertion of gas-displacing forces at at least one pair of locations at one of which the viscosity of the glass is not less than $10^{7.6}$ poises and not more than $10^{13}$ poises, gas-displacing forces causing displacements of gases in at least one direction across the ribbon on one or each side thereof are also exerted in at least one zone along the ribbon path where the viscosity of the glass is less than $10^{7.6}$ poises. In the event that such action is taken, its effect in countering wave formation appears to be enhanced by the exertion of gas-displacing forces at at least one pair of higher viscosity zonees in accordance with the invention. In other words there is in that respect an interaction between the effects resulting from the two measures. In most cases it is suitable and advisable, for countering wave formation, to exert such additional gas-displacing forces in a lower portion of the zone through which the glass ribbon is drawn and in which it becomes dimensionally set.

The invention can be applied successfully to a wide variety of glass-drawing processes, for example in a process in which molten glass flows into the ribbon from the full depth of a quantity of molten glass in a channel into which molten glass is continuously fed, in a process in which molten glass flows into the ribbon from the upper levels of a mass of molten glass in a channel into which molten glass is continuously fed, and in a process in which the ribbon is drawn from a supply of molten glass floating on a mass of material of higher specific gravity.

The invention includes apparatus for use in manufacturing sheet glass, and composed of a drawing chamber and a contiguous annealing shaft, means for drawing a continuous ribbon of glass into such drawing chamber from a drawing zone fed with molten glass and conducting the ribbon along a path extending through such drawing chamber and annealing shaft, and means for simultaneously exerting gas-displacing forces in at least one pair of successive locations along the ribbon path, the forces exerted at the different locations of such pair being exerted in opposite directions across the ribbon path so as to cause simultaneous displacement of gases in different directions across the ribbon, the locations being spaced apart along the ribbon path by a distance such that the difference in the viscosities of the glass ribbon at the two locations when the apparatus is in use is not more than $10^{2.5}$ poises and at least one of such locations being one wherein the viscosity of the glass when the apparatus is in use is not less than $10^{7.6}$ poises and not more than $10^{13}$ poises.

Such apparatus has the important advantage that it enables sheet glass to be manufactured which is substantially or completely free of dark stripes.

Various advantageous apparatus features can be incorporated in apparatus according to the invention. These features are for the purpose of adopting process features which have already been described. The advantages of these further features of apparatus will be understood from what has been stated above about corresponding process features.

In certain forms of apparatus according to the invention there is a vertical shaft the cross section of which is locally reduced at the bottom to define an entry slot for the ribbon and the apparatus has the feature that at least one location of a pair of locations at which gas-displacing means operates to exert the gas-displacing forces is in the entry slot.

In some apparatus according to the invention there is a vertical annealing shaft the cross section of which is locally reduced at the bottom to define an entry slot for the ribbon and the apparatus is such that at least one location of a pair of locations at which the gas-displacing means operates to exert the gas-displacing forces is in said vertical shaft.

In other important embodiments of apparatus according to the invention there is a bending roller about which, when the apparatus is in use, the glass ribbon is bent preparatory to being advanced through the annealing shaft, which shaft is substantially horizontal, and the apparatus is such that at least one location of a pair of locations at which said gas-displacing means operates to exert gas-displacing forces is downstream of the bending roller along the ribbon path.

Advantageously, the locations of at least one pair of locations at which the gas-displacing means operates to exert gas-displacing forces are so disposed that gases which have been displaced in one direction across the ribbon by force exerted at one location can flow in the free environment of the ribbon to a place from which they will be displaced in the reverse direction across the ribbon by force exerted at the other location.

The invention includes apparatus in which there is guide means for positively guiding gases which have been displaced across the ribbon by force exerted at one or each location of at least one pair of locations, to a place at which they will be displaced across the ribbon by force exerted at the other location of such pair.

It is very satisfactory for apparatus according to the invention to be provided with means for causing gas-displacing force at at least one pair of locations to be exerted periodically and in alternation with forces which act across the same zones along the ribbon path and which reverse the direction of displacement of gases across the ribbon path in each of such zones.

In apparatus provided with such means for periodically reversing the displacements of gases across the ribbon, it is preferred to provide timing means which causes the exertion of force in one direction across the ribbon path at each of those zones to immediately follow or to coincide with the relaxation of force acting in the other direction across the ribbon path at that zone.

A particularly recommended feature consists in the provision of means for exerting a gas-displacing force at at least one location of the pair of locations by blowing gas into the environment of the ribbon at that location. According to a preferred feature, one location of the pair is in the vicinity of one edge margin of the ribbon path and the other location of such pair is in the vicinity of the other edge margin of the ribbon path.

In preferred apparatus according to the invention, there is a pair of locations which are in the vicinity of one edge margin of the ribbon path and opposite to that pair there is another pair of locations which are in the vicinity of the opposite edge margin of the ribbon path, and the gas-displacing means is arranged so as, when the apparatus is in use, to simultaneously exert gas-displacing forces at such four locations so that the forces exerted at the four locations cooperate to bring about displacements of gases across the ribbon path.

In certain apparatus according to the invention, the locations of the or each such pair at which gas-displacing means operate to exert such gas-displacing forces are such that the forces cause displacements of gases across the ribbon path only on one side thereof.

Preferably there is means for blowing gas into the environment of the ribbon at one pair of locations and means for exerting cooperating suction forces at another pair of locations. In particular, it is advantageous to provide a gas ejector in at least one location of a pair of locations and to provide means for exerting a gas-displacing force by blowing gas into the environment of the ribbon through such ejector. The use of ejectors is recommended, inter alia because of the large volume rate of displacement of gases which can be induced by injecting a relatively small quantity of gas and without using a high injection pressure, these advantages being due to the action of the diffuser associated with the ejector.

In certain embodiments of apparatus according to the invention there is a propeller in at least one location of a pair for exerting a gas-displacing force.

Preferably means is also provided for exerting gas-displacing forces across the ribbon path on one or each side thereof in a lower portion of the drawing chamber.

Apparatus according to the invention may be of any of a variety of different basic designs. For example, the invention includes apparatus having a molten glass feed channel for holding a bath of molten glass of such depth that molten glass flows into the ribbon from the full depth of such bath; apparatus having a molten glass feed channel for holding a bath of molten glass of such depth that the molten glass which flows into the ribbon is derived from the upper levels of such bath; and apparatus having a molten glass feed channel along which molten glass feeds to the drawing zone while floating on a mass of material of higher specific gravity.

The invention includes sheet glass when manufactured by a process according to the invention or in apparatus according to the invention as hereinbefore defined.

DESCRIPTION OF THE PREFERRED EMBODIMENTS

Figure 1:
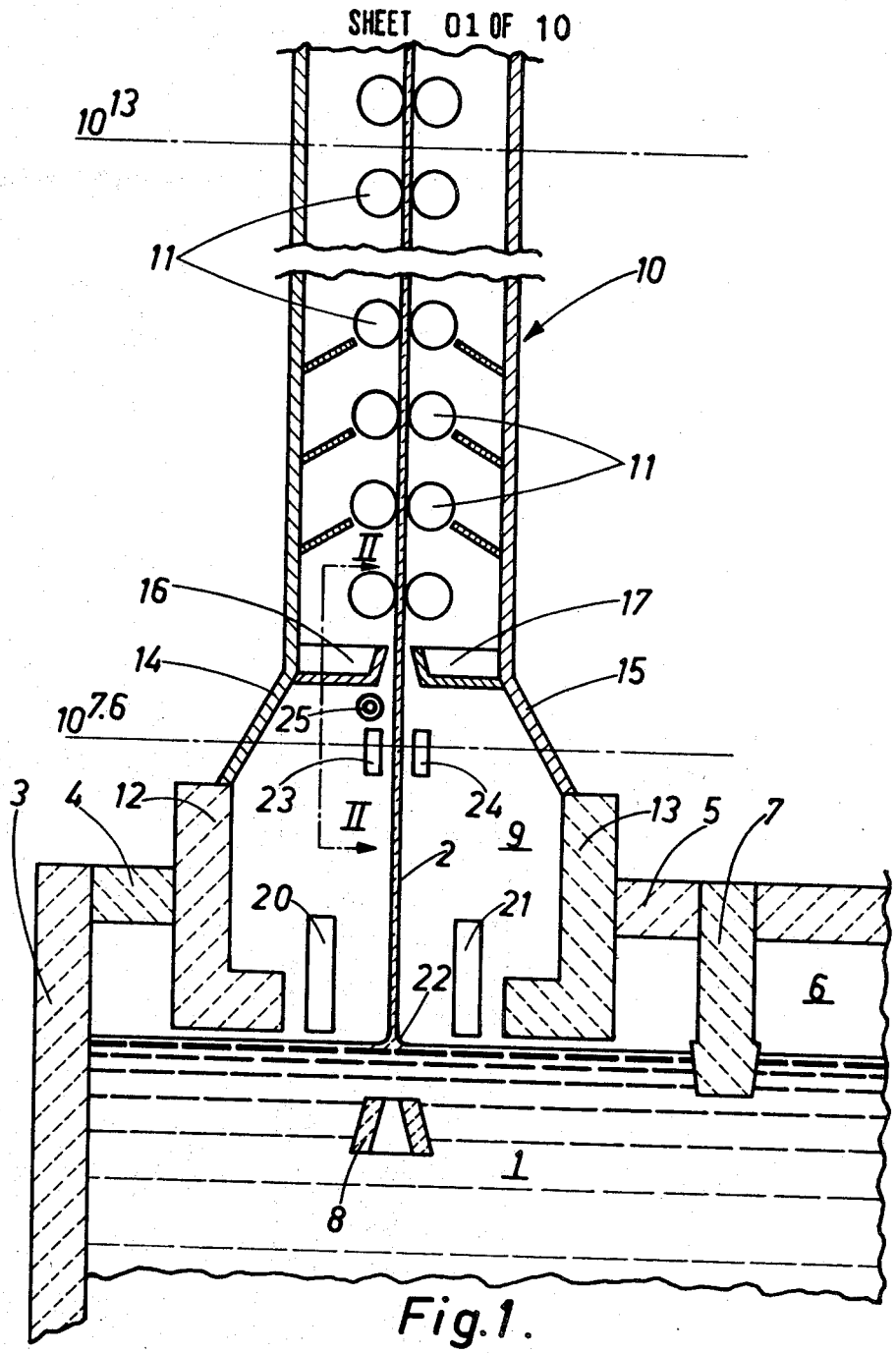
FIG. 1 is a cross-sectional elevational view of part of a Pittsburgh-type glass drawing machine equipped with means for carrying out a process according to the invention.

It is emphasized that the examples of the invention which are illustrated in the accompanying drawings and which will now be described in detail are in no way limitative for the invention and show only a few ways in which the invention can be carried out.

In the drawings, dot-dash lines are used to indicate the planes transverse to the path of the drawn glass ribbon at which the glass has certain specified viscosity values. It is to be understood that the precise spot along the ribbon path at which a particular viscosity value occurs will depend in any given process on the characteristics of the drawing machine and on the drawing conditions which prevail in that process, and the placement of the lines in the drawings is correct for one particular machine and one particular set of operative conditions.

Figure 2:
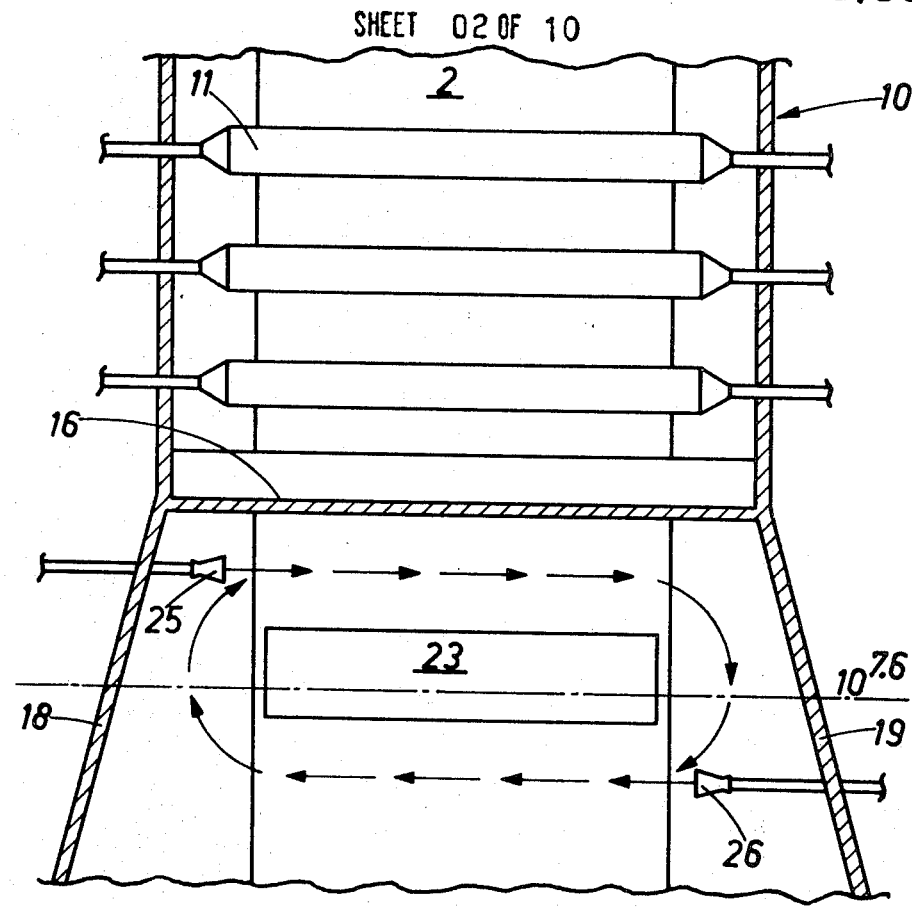
FIG. 2 is a cross-sectional view along line II—II of FIG. 1.

In the machine and process depicted in FIGS. 1 and 2, molten glass 1 is supplied to a drawing zone at which a ribbon of glass 2 is drawn upwardly from the surface of the bath through a drawing chamber. The supply of molten glass is held in a kiln of which part of a terminal end wall 3 and roof portions 4 and 5 appear in cross section in FIG. 1. The molten glass is supplied along the kiln from a glass-melting furnace (not shown). The region 6 above the molten glass in the kiln is in communication with the atmosphere in the glass-melting furnace and this region 6 is isolated from the atmosphere within the drawing chamber by a shut-off 7 which extends transversely of the kiln and dips into the upper layers of the molten glass in the kiln.

The region at the surface of the molten galss from which the glass ribbon is drawn is stabilized by a draw bar 8 which is immersed in the molten glass 1. The ribbon of glass 2 is drawn upwardly through the drawing chamber 9 and through a contiguous vertical annealing shaft, or lehr, 10 by pairs of rollers 11 mounted in this annealing shaft.

The drawing chamber 9 is formed in part by rear and front L-blocks 12 and 13 the bottom faces of which are close to the surface of the molten glass in the kiln, and by upper wall portions 14 and 15 which extend between those L-blocks and the annealing shaft.

The drawing chamber is partly closed at the top by catch pans 16 and 17 which are slightly spaced apart to define an entry slot via which the ribbon passes from the drawing chamber into the annealing shaft. The drawing chamber is laterally bounded by side walls 18 and 19, as shown in FIG. 2.

In the lower portion of the drawing chamber there are main coolers 20 and 21 located on opposite sides of the path of the glass ribbon and close to the ribbon source, or meniscus, 22. These coolers, which accelerate the dimensional setting of the ribbon, are cooled by a cooling fluid, normally water, which is circulated through the coolers via conduits (not shown).

In order to avoid or reduce the impairment of the drawn sheet glass by defects in the form of dark stripes, displacement forces are exerted on gases in the environment through which the ribbon is drawn, as will be described.

The displacement forces are exerted by blowing gas into the environment of the ribbon through a pair of ejectors 25 and 26. As shown in FIG. 2, the two ejectors are located opposite the opposed edge margins of the ribbon and at different levels along the ribbon path, and they point in opposite directions across the ribbon. The two ejectors are located in a common vertical plane which is slightly spaced from the rear side of the ribbon, as can be seen in FIG. 1.

During the drawing of the sheet glass, gas which has been preheated in any suitable manner, e.g. in a heat exchanger located in the drawing chamber, is forced continuously through the two ejectors. In consequence, the displacement of environmental gases takes place in one direction across the ribbon path at the general level of the ejector 25 and in the opposite direction across the ribbon path at the general level of the ejector 26. Thus, there is an entrainment of gases from one level to the other adjacent to the edge margins of the ribbon path so that there is a continuous circulation of gases in a closed and generally oval circuit adjacent to the rear face of the glass ribbon, as indicated by the arrows in FIG. 2.

As appears from the drawings, the ejector 25 is located at a level which is a little above the level at which the viscosity of the glass ribbon is $10^{7.6}$ poises, the axis of this ejector actually being on a line passing between the secondary cooler 23 and the catch pan 16. The other ejector, 26, is located below that viscosity level and its axis is actually on a line which passes beneath the secondary cooler 23.

In tests which were performed with a machine as represented in FIGS. 1 and 2, the difference in the viscosities of the glass ribbon at the levels of the ejectors 25 and 26 was 10 poises. Preheated gas was delivered to the ejectors under a pressure of 400gr/cm$^2$, causing a displacement of gases at a velocity of 10m/sec from the ejectors. It was found that the displacement of gases across the ribbon path by the action of the ejectors 25 and 26 resulted in a substantial improvement in the quality of the drawn sheet glass in that it became substantially free from dark stripes.

Figure 3:
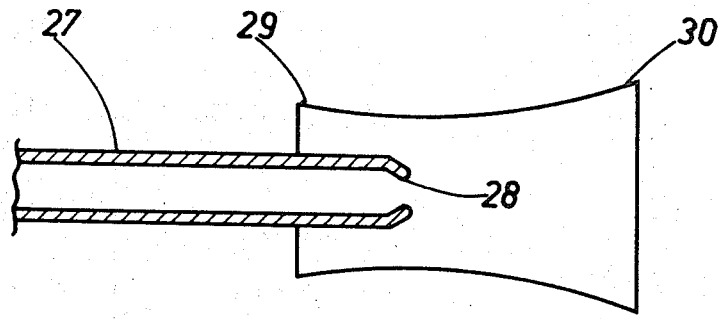
FIG. 3 is a detail view showing a typical ejector device used in the machine illustrated in FIGS. 1 and 2.

FIG. 3 shows a type of ejector which is very suitable for use in a machine according to the invention. This ejector is of the Giffard or Venturi type. The ejector includes an injection tube 27, the discharge orifice 28 of which is located within a sleeve or diffuser whose rear end portion 29 converges toward the axis of the injection tube 27 and whose front end portion 30 diverges from that axis.

The use of such an ejector affords important advantages, in particular an economy in the consumption of gas under pressure, an economy of heat, the entrained gases attaining a higher temperature, an entrainment of a large quantity of environmental gases and a gas displacement rate which is appreciably in excess of the speed of delivery of gas through the injection tube.

It has been observed that it is sufficient to inject air which has been preheated to about 60° C. After mixing of this injected air with environmental gases within the sleeve of the ejector, the mixture of gases which leaves the ejector sleeve and enters the free environment of the glass ribbon has a temperature very close to the normal environmental temperature at that region.

Figure 4:
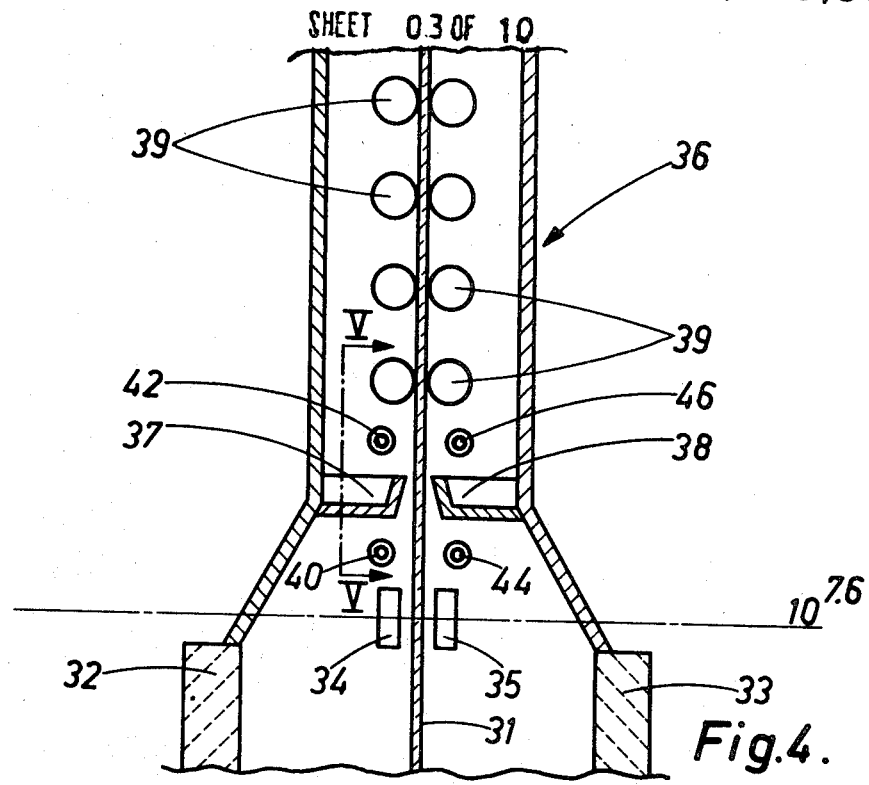
FIG. 4 is a cross-sectional elevational view of part of another glass drawing machine equipped for carrying out a process according to the invention.
Figure 5:
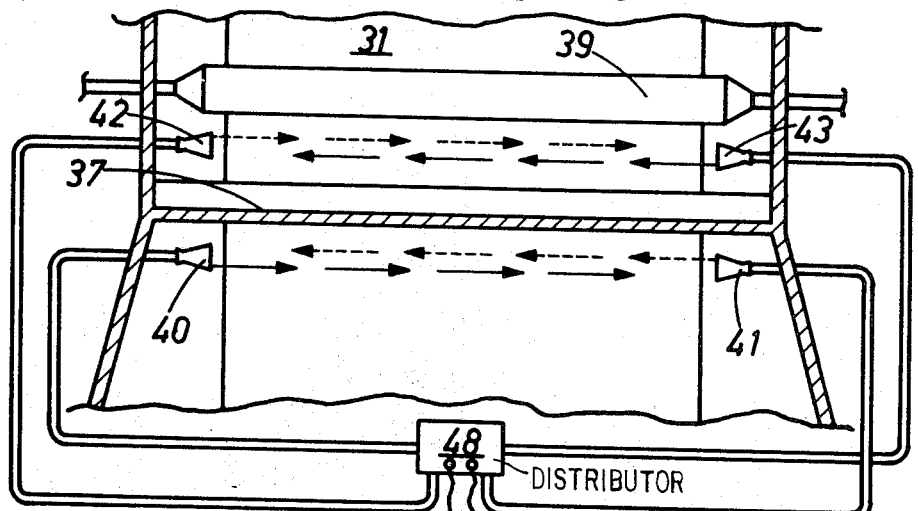
FIG. 5 is a cross-sectional view along line V—V of FIG. 4.

FIGS. 4 and 5 illustrate another embodiment of the invention in which use is made of a Pittsburgh-type drawing machine. In this machine a ribbon of glass 31 is drawn upwardly between two L-blocks 32 and 33 forming parts of the walls of the drawing chamber. The ribbon passes upwardly between secondary coolers 34 and 35 located in the upper part of the drawing chamber and then enters the annealing shaft 36 between the catch pans 37 and 38. The ribbon is drawn upwardly through the annealing shaft by pairs of rollers 39 located in the shaft. In FIG. 4 there is shown the level at which the glass ribbon has a viscosity substantially equal to $10^{7.6}$ poises.

In one embodiment of the method according to the invention gas-displacing forces are exerted in the environment of the glass ribbon by supplying gas under pressure to pairs of ejectors located on opposite sides of the glass ribbon path. There are four ejectors 41, 42, 43, and 44 which act at the rear side of the ribbon. Their locations relative to each other and to the projected width of the glass ribon are clearly shown in FIG. 5. At the front side of the glass ribbon, there are four further ejectors. These further ejectors are disposed relative to each other and to the projected width of the glass ribbon in precisely the same way as the four ejectors at the rear side of the ribbon. This means that in the view of FIG. 5 the four ejectors at the front side of the ribbon are directly behind the four ejectors 40–43 at the rear side of the ribbon. In the cross section of FIG. 4, only two ejectors 44 and 46 of the four ejectors at the front side of the ribbon appear.

The injection tubes of the eight ejectors are connected to a source of gas under pressure via an electrically controlled distributor 48 which operatively connects such tubes to the source according to the following predetermined cycle: In a first period of the cycle, the ejectors 40 and 43 at the rear side of the ribbon are operated, together with the correspondingly placed ejectors at the front side of the ribbon, i.e., the ejector 44 and the ejector which in the view of FIG. 5 is directly behind the ejector 43. During this first period of the cycle there is consequently a continuous displacement of gases in opposite directions across the ribbon path on each side thereof as indicated by the full-line arrows in FIG. 5. In the second period of the cycle, the ejectors 41 and 42 at the rear side of the ribbon and the correspondingly placed ejectors at the front side of the ribbon are operated so that in this second period of the cycle gas displacement across the ribbon path occurs at the two levels, on each side of the ribbon, but in the directions indicated by the broken-line arrows in FIG. 5, i.e., in the directions opposite to the direction of gas displacement in the first period of the cycle.

The action of the ejectors in each period of the cycle induces a circulation of gases on each side of the ribbon, similar to the circulation represented by the arrows in FIG. 2 illustrating another embodiment of the invention. However, it will be noted from FIG. 4 that the axes of the ejectors located at the different levels on each side of the ribbon are in a plane which is slightly inclined to the vertical so that the general plane in which the circulation of gases occurs on each side of the ribbon is comparably inclined to the vertical.

It will be noted that in the embodiment depicted in FIGS. 4 and 5, all of the ejectors are located above a level at which viscosity of the glass ribbon is $10^{7.6}$ poises.

In experimental manufacturing operations performed using the apparatus shown in FIGS. 4 and 5, the difference between the viscosities of the glass ribbon at the levels of the upper and lower ejectors was substantially $10^2$ poises. Preheated gas was supplied to the ejectors, according to the described cycle, under a pressure of 250gr/cm², causing gases to be displaced from the ejectors at a velocity of 10m/sec. Each cycle of the ejector operations was of 20 seconds duration divided into equal first and second periods, each lasting ten seconds. It was found that the displacement of gases caused by this operation of the ejectors had a beneficial effect on the quality of the drawn sheet glass in that the drawn sheet glass was substantially free from dark stripes. When the machine was operated without operating the ejectors, but under otherwise identical conditions, the sheet glass drawn in the machine was substantially impaired by dark stripes.

In further tests performed using apparatus as shown in FIGS. 4 and 5, the cycle of operation of the ejectors was set so that the direction of gas displacement at each of the two levels on each side of the glass ribbon was reversed once every minute, the pressure of the gas delivered to the ejectors being however somewhat higher than in the tests previously described. In the further tests, a similar improvement in the quality of the sheet glass was realized as a result of the operation of the ejectors.

Figure 6:
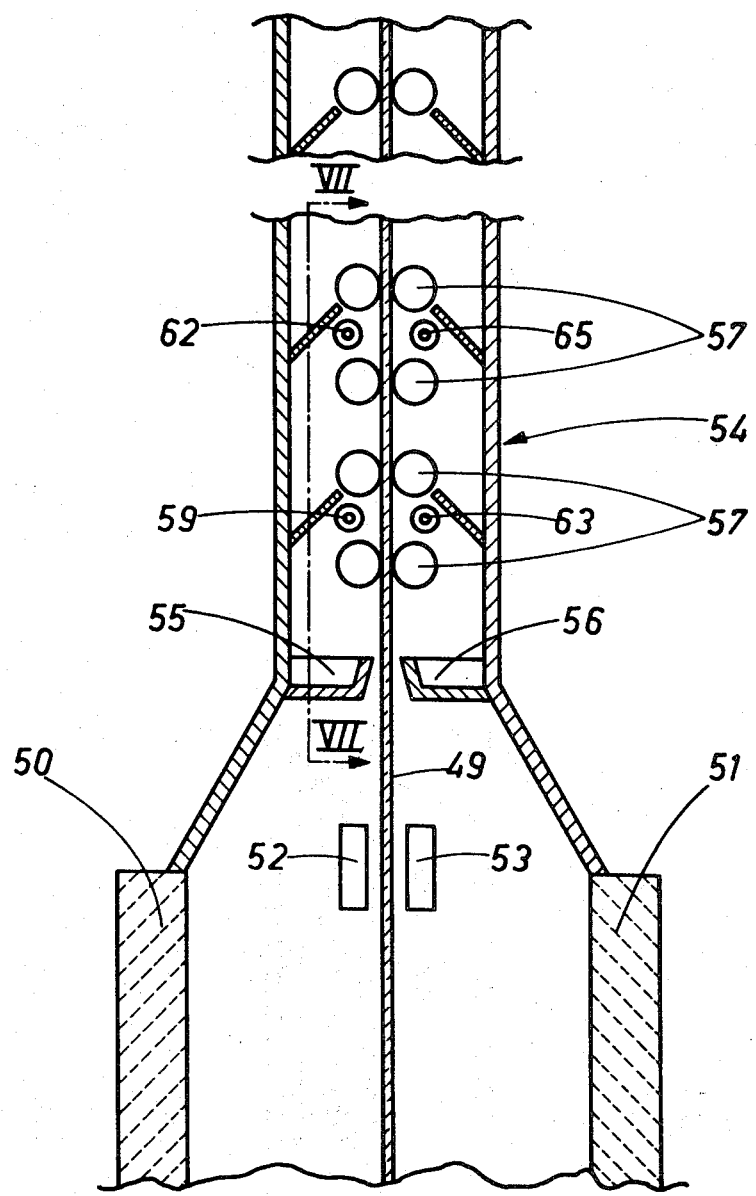
FIG. 6 is a cross-sectional elevational view of part of a further glass drawing machine equipped according to the invention.
Figure 7:
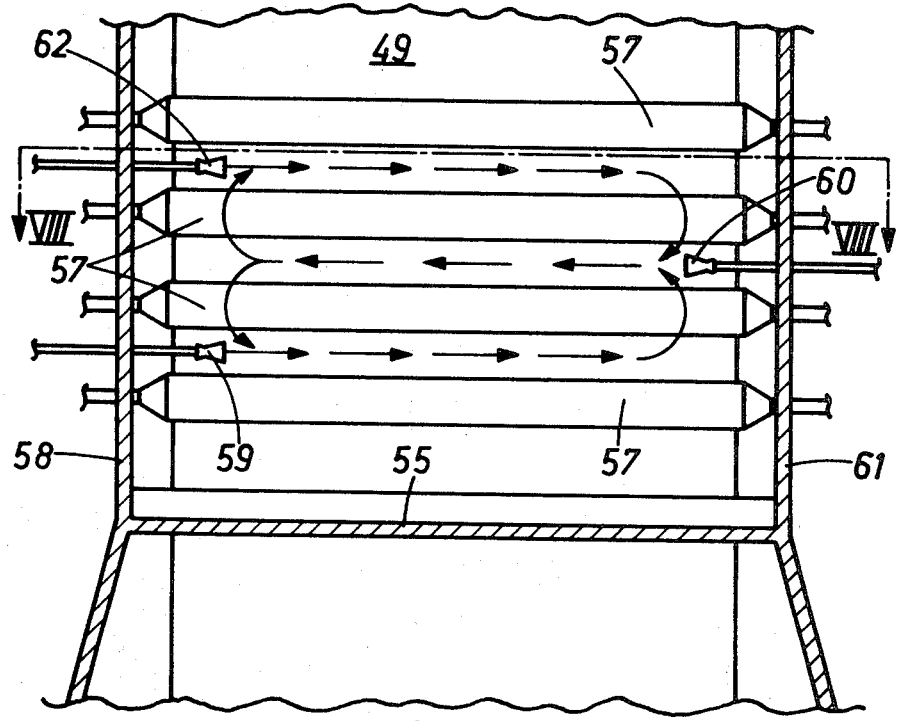
FIG. 7 is a cross-sectional view along line VII—VII of FIG. 6.
Figure 8:
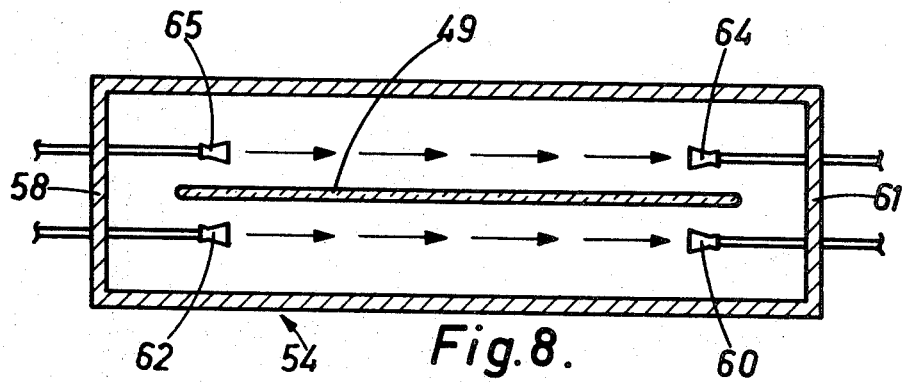
FIG. 8 is a cross-sectional plan view of part of the machine shown in FIGS. 6 and 7, along the line VIII—VIII of FIG. 7.

In the embodiment of the invention shown in FIGS. 6, 7 and 8, which show portions of the drawing chamber and annealing shaft of a Pittsburgh-type glass drawing machine, a glass ribbon 49 is drawn upwardly through a drawing chamber which is composed of the usual rear and front L-blocks 50 and 51. The glass ribbon is drawn upwardly between two secondary coolers 52 and 53 and into the vertical annealing shaft 54 through the slot between catch pans 55 and 56 which partly close the top of the drawing chamber. The glass ribbon is drawn upwardly by pairs of rollers 57 mounted in the annealing shaft.

The gaseous environment through which the glass ribbon is drawn is influenced according to the invention in such a way as substantially to prevent the occurrence of dark stripes in the drawn sheet glass, by discharging gas into the environment of the ribbon, on each side of its path, through pairs of ejectors which are located between the levels at which the viscosity of the glass ribbon is $10^{7.6}$ and $10^B$ poises.

In the illustrated embodiment, the ejectors are located between the levels of the first and the fourth pairs of rollers 57. At the rear side of the ribbon, and adjacent the side wall 58 of the annealing shaft, there is an ejector 59 located at a level between the first and second pair of rollers. On the same side of the glass ribbon and adjacent the side wall 61 of the annealing shaft, there is a further ejector 60 which is located at a level between the second and third pairs of rollers 57, and directly above the ejector 59 and at a level between the third and fourth pairs of rollers 57, there is an ejector 62. At the front side of the ribbon there is a further set of three ejectors. The positions of these further ejectors relative to each other and to the path of the glass ribbon and the annealing shaft are the same as for the ejectors 59, 60 and 62 at the rear side of the ribbon. This means that the ejectors of the second set, located at the front side of the ribbon, are, in the view of FIG. 7, located directly behind the ejectors 59, 60 and 62. In the cross section shown in FIG. 6, only two ejectors 63 and 65 of the second set of ejectors are apparent.

During the drawing of the sheet glass, gas under pressure is supplied continuously to the three ejectors of each set, resulting in a continuous circulation of gases on each side of the ribbon are represented by the arrows in FIG. 7. It will be seen that on each side of the ribbon, gases traverse two circuits of substantially oval shape, one above the other, the gas movement in one circuit being clockwise and the gas movement in the other circuit being counterclockwise. The displacements of gases across the ribbon path at each of the three levels at which ejectors are located, occurs in the same direction on the two sides of the ribbon as appears from the plan view of FIG. 8.

In tests performed with the apparatus of FIGS. 6 to 8, gas was supplied to the ejectors under a pressure of 200gr/cm². The difference between the viscosity of the glass ribbon at the level of the lowest ejectors 59 and 63, and the viscosity at the level of the middle ejectors 60 and 64 was approximately $10^{12}$ poises. The distance between the level of the middle ejectors 60 and 64 and the level of the highest ejectors 62 and 65 likewise corresponded to a viscosity interval of approximately $10^{12}$ poises. It was found that as a result of the displacement of gases caused by the operation of the ejectors, the quality of the drawn sheet glass was substantially improved in that the dark stripes which marred the glass when it was drawn without causing such displacements of environmental gases no longer appeared.

In a modification of the process described with reference to FIGS. 6 to 8, the ejectors 60 and 62 and the corresponding ejectors at the front side of the ribbon path were removed and replaced by two ejectors, located one on each side of the ribbon path, at a level between the third and fourth pairs of rollers 57, and directly above the positions occupied by the middle ejectors in the illustrated embodiment. In other words, the modification was equivalent to moving ejector 60 and the corresponding ejector at the rear side of the ribbon to a higher level corresponding with the level of ejectors 62 and 65, and removing the latter ejectors. When gas under pressure was delivered to the two ejectors on each side of the ribbon path, in the modified embodiment, there was a displacement of gases on each side of the ribbon path in a single closed circuit covering the portion of the ribbon path between the bottom and top ejectors, corresponding to a viscosity interval of the order of $10^{12}$ poises. A similar improvement in the quality of the drawn sheet glass was attained by operating in accordance with the modification.

Figure 9:
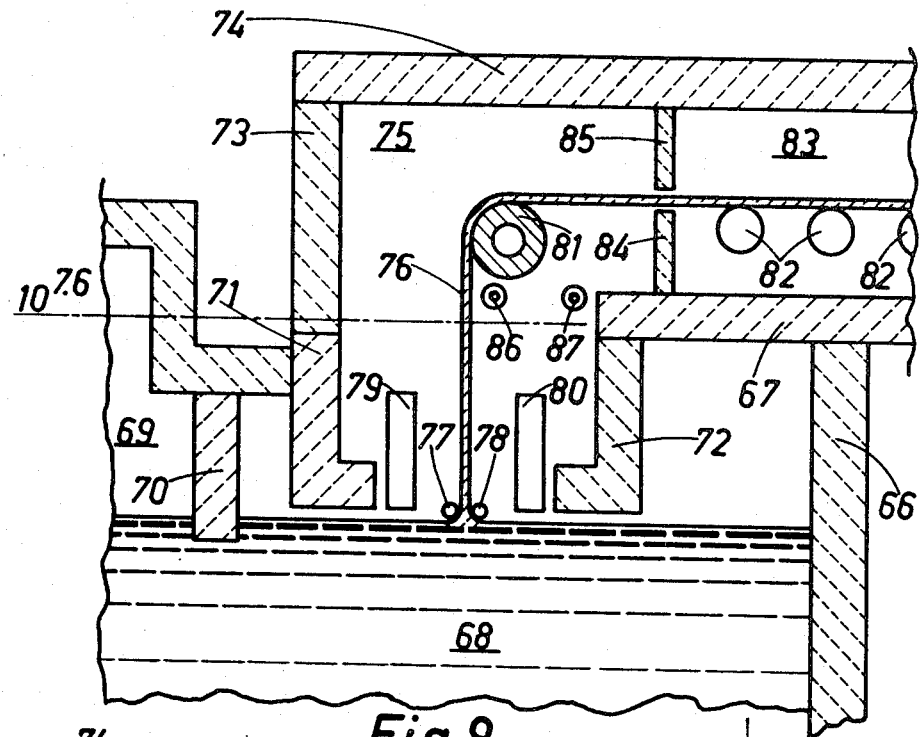
FIG. 9 is a cross-sectional elevational view of part of another glass drawing machine equipped for carrying out a process according to the invention.
Figure 10:
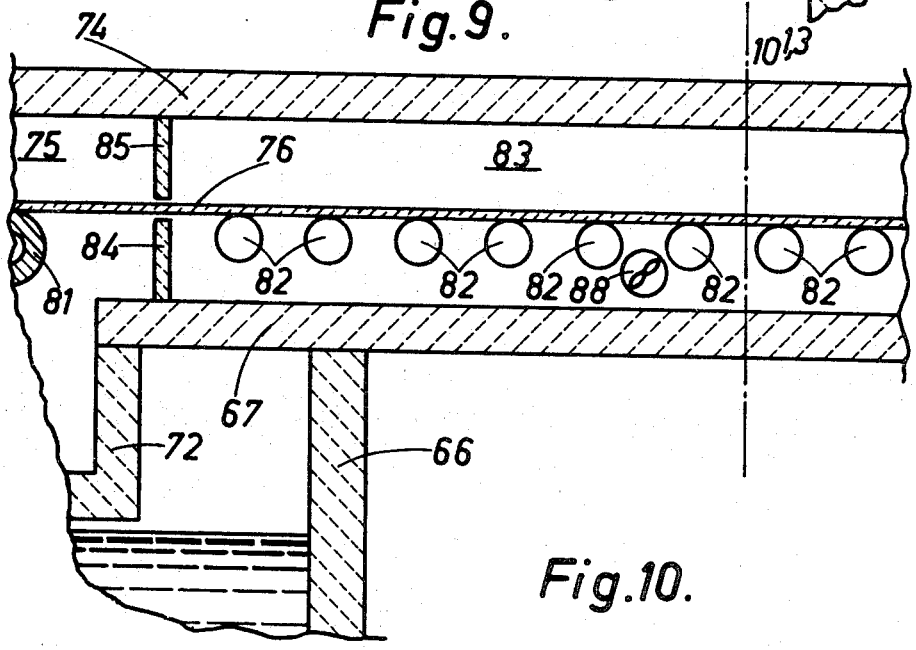
FIG. 10 is a cross-sectional elevational detail view of part of the machine of FIG. 9.

In the machine illustrated in FIGS. 9 and 10 molten glass is drawn from a kiln of which part of the terminal end wall 66 and part of a roof 67 are shown. The atmosphere above the molten glass 68 in the region 69 communicates with the glass-melting furnace from which the molten glass is supplied. This atmosphere is isolated from the atmosphere above molten glass at the drawing zone by a shut-off 70 which dips into the upper layers of the molten glass. The molten glass is drawn upwardly as a ribbon into a drawing chamber 75 composed of L-blocks 71 and 72, an upper wall portion 73 and a roof wall 74.

At the root or meniscus of the glass ribbon 76 it is gripped at its edges by pairs of edge rollers such as 77 and 78 which maintain the width of the ribbon substantially constant. The ribbon is drawn vertically upwardly into the drawing chamber between main coolers 79 and 80 and passes round a bending roll 81, and the ribbon is then conveyed by rollers 82 through a horizontal annealing shaft 83. The interior of the annealing shaft is partitioned from the drawing chamber by partition walls 84 and 85 which are spaced to define a slot for the passage of the ribbon. The partition wall 84 may for example be a refractory screen whereas the wall 85 may for example be an asbestos screen.

On FIG. 9 there is shown the approximate level at which the glass ribbon has a viscosity of $10^{7.6}$ poises.

In order to influence the environmental conditions through which the glass ribbon is drawn, in such a manner as substantially to avoid the occurrence of dark stripes in the drawn sheet glass, gas displacement forces are exerted on gases in the environment of the ribbon, at a region where the viscosity of the glass ribbon is a little higher than $10^{7.6}$ poises. These forces are exerted by blowing preheated gas into such environment through first one and then the other of two pairs of ejectors. One ejector of each pair, namely ejector 86 and ejector 87, appear in the view of FIG. 9. These ejectors are located opposite what in the view of FIG. 9 is the remote edge margin of the glass ribbon and point across the ribbon path. The other ejectors point in the opposite direction across the ribbon path and are located opposite the nearer edge margin of the ribbon so that they do not appear in FIG. 9. One of these other ejectors is coaxial with the ejector 86 and the second of these other ejectors is coaxial with the ejector 87.

Preheated gas under pressure is delivered to the four ejectors according to a predetermined operating cycle having two phases. In a first phase, ejector 86 and the ejector which is coaxial with ejector 87 are operated to cause displacement of gases across the ribbon path in opposite directions at the zones where such ejectors are operative and in the second phase of the cycle those ejectors are idle and ejector 87 and the ejector which is coaxial with the ejector 86 are operated so that the displacements of gases across the ribbon path at those zones are reversed. In each phase of the cycle, the forces exerted by the discharge of gases from the ejectors causes gases in the environment of the ribbon to be displaced in a closed circuit and the direction of circulation of the gases is reversed at the end of each phase.

In one specific process according to the invention performed as just described, the ejectors were operated on a 10 minute cycle, each phase of the cycle lasting 5 minutes. This means that the commencement of operation of one pair of coacting ejectors coincided with the cessation of the action of the other pair of ejectors. It was found that such operation of the ejectors had the beneficial result that the drawn sheet glass was substantially free of dark stripes. Such dark stripes were easily detectable in sheet glass drawn during a period in which all of the ejectors were inoperative but in which the operating conditions were otherwise the same.

In the apparatus used in the above-described test, the ejectors were mounted so that they could be axially displaced so as to occupy different positions relative to the widthwise dimension of the glass ribbon. In a further test, the ejectors were operated according to a cycle as above described but the ejectors at one side of the machine were set at a position opposite a central region of the ribbon so that the circulation of gases was mainly confined to one half of the ribbon width. When the sheet glass drawn in that test was examined it was found that that portion of the ribbon width which had been influenced by the circulation of the gases was substantially free of dark stripes, but dark stripes were easily detectable in the other part of the ribbon width.

In the annealing shaft 83 of the machine shown in FIGS. 9 and 10 there is a pair of propellers located below the path of the glass ribbon and opposite the opposed edge margins of the ribbon. The propeller 88 is opposite what in the view of FIG. 10 is the remote edge margin of the ribbon. It will be seen that this propeller is located at a point along the ribbon path where the viscosity of the glass is somewhat below $10^{13}$ poises. The other propeller, which is located opposite the nearer edge margin of the ribbon and which is therefore not shown, is disposed so that its axis is coincident with a transverse line passing between the first and second pairs of the rollers 82 on the downstream side of the $10^{13}$ poises viscosity line.

In the tests, using the apparatus shown in FIGS. 9 and 10, which have already been described, the propellers were idle and the gas displacements according to the invention were caused solely by the operation of the ejectors. In a further test using this apparatus, the ejectors were rendered inoperative and gas displacements according to the invention were brought about by continuously rotating the propellers in the annealing shaft to cause gases at the locations of the propellers to be displaced across the ribbon path at a velocity of 10m/sec. while following a closed and substantially oval circuit. It was found that by this action of the propellers the environment of the glass ribbon was favorably influenced in that the drawn sheet glass was less marred by dark stripes than sheet glass drawn in the same apparatus, without operating either the ejectors or the propellers, but under otherwise identical conditions.

In a further test, the electric motors by which the propellers were rotated were operated intermittently instead of continuously. The electric motors were placed under the control of automatic timing means causing operation of the motors for periods of 10 minutes with intervening inoperative periods which were insufficiently long in duration to allow a natural pattern of convection currents to become established in the annealing shaft. It was found that this periodic operation of the propellers also favorably influenced the environmental conditions in a way which very substantially reduced the incidence of dark stripe defects in the drawn sheet glass.

Figure 11:
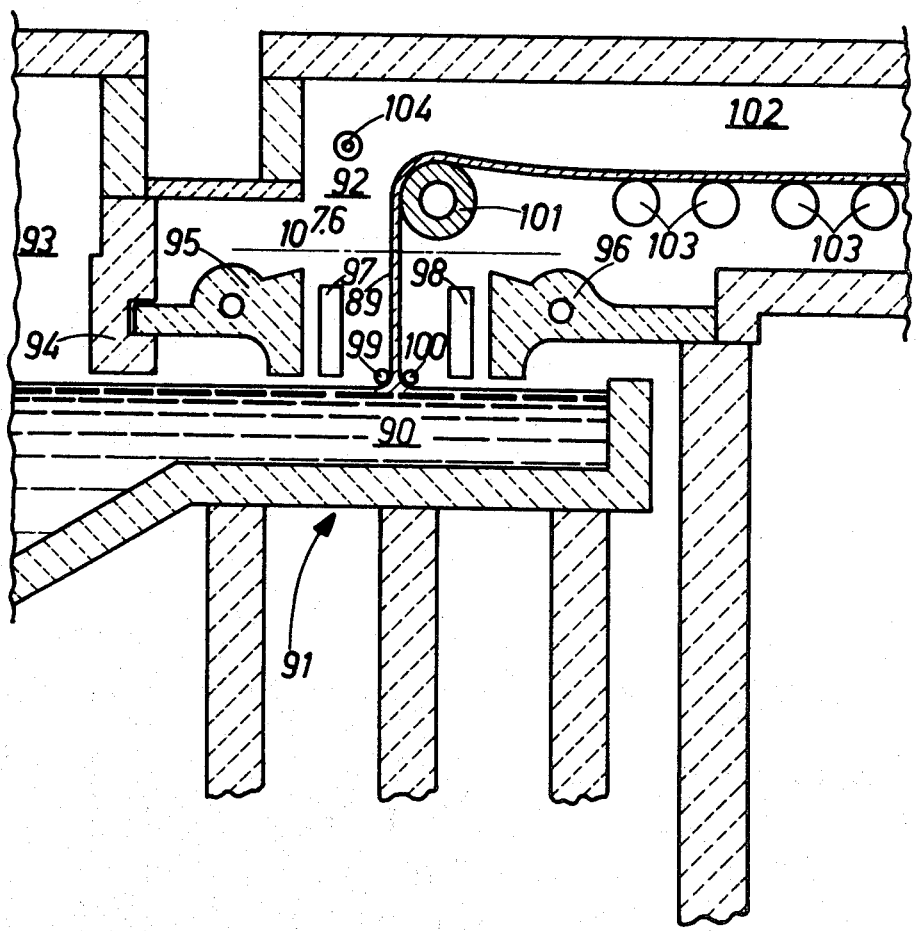
FIG. 11 is a cross-sectional elevational view of part of a Libbey-Owens-type glass drawing machine equipped for carrying out a process accroding to the invention.

FIG. 11 represents a drawing machine of the classic Libbey-Owens type which has been modified according to the invention. In this machine a ribbon of glass 89 is drawn from the free surface of the bath 90 of molten glass held in a kiln 91. The atmosphere in the drawing chamber 92 located above the molten glass bath is separated from the atmosphere in the zone 93 which communicates with the glass-melting tank furnace (not shown) by a wall 94.

The drawing chamber is defined in part by lip-tiles 95 and 96 situated close to the surface of the molten glass bath. At positions close to the inner faces of these lip-tiles, and on respectively opposite sides of the glass ribbon 89, there are main coolers 97 and 98. The position of the bottom or meniscus of the ribbon is stabilized by pairs of edge rolls such as 99 and 100 which grip the margins of the ribbon and maintain its width substantially constant. After passing upwardly between the main coolers 97 and 98, the glass ribbon 89 bends about a bending roller 101 through an angle of approximately 90° and then proceeds through a horizontal annealing shaft 102 while supported on conveying rollers 103.

The drawing shows the approximate level along the ribbon path at which the ribbon glass has a viscosity of $10^{7.6}$ poises. The invention is carried out by blowing gas into the environment of the ribbon through a pair of ejectors. In the cross section of FIG. 11 only one of these ejectors, 104, is shown. Ejector 104 is located opposite what, in the view of FIG. 11, is the remote edge margin of the glass ribbon. The other ejector of the pair is located at a lower level, in fact substantially at the $10^{7.6}$ poise viscosity level, opposite the nearer edge margin of the glass ribbon. The two ejectors point in respectively opposite directions across the ribbon path and are located with their axes in the same vertical plane.

In one embodiment of the process according to the invention, using the apparatus of FIG. 11, the viscosity interval between the locations along the ribbon path which are immediately opposite the upper and lower ejectors was approximately $10^{1.5}$ poises. Preheated gas was continuously supplied through the two ejectors so as to cause a continuous circulation of gases in a substantially oval circuit, in contact with the ribbon. The preheated gas was supplied to the ejectors at a pressure of 300gr/cm². It was found that the displacement of gas had a very beneficial effect on the environmental conditions, resulting in the drawn sheet glass becoming free from dark stripes.

Figure 12:
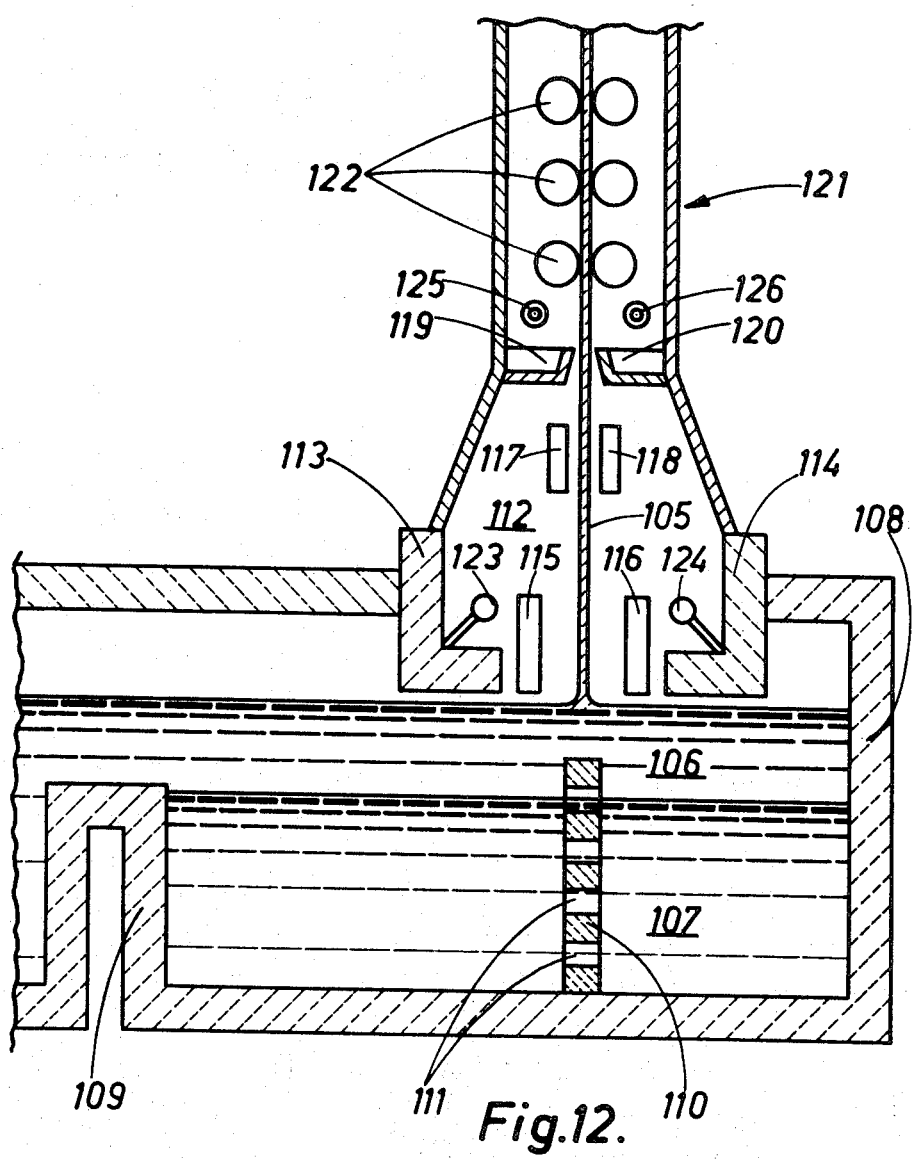
FIG. 12 is a cross-sectional elevational view of part of a further glass drawing machine equipped according to the invention.

FIG. 12 shows another emodiment of the invention in which the glass ribbon 105 is drawn from a supply of molten glass 106 which floats on a bath of molten material 107 of higher specific gravity than the molten glass, for example molten tin. The molten material is held in a kiln composed of a terminal end wall 108 and a sill 109 which extends transversely of the kiln up to a level above the surface of the molten tin so that this is confined to the zone between the sill 109 and the terminal end wall 108. At the region from which the ribbon of glass is drawn, there is a wall 110 which extends upwardly from the bottom of the kiln to a level a short distance beneath the surface of the molten glass. This wall 110 is provided with openings 111 allowing for the free passage of molten material from one side of the wall to the other.

The glass ribbon 105 is drawn upwardly through a drawing chamber 112 composed of two L-blocks 113 and 114, two main coolers 115 and 116 and two secondary coolers 117 and 118. The ribbon passes upwardly from the drawing chamber between catch pans 119 and 120 and enters the vertical annealing shaft 121 containing pairs of drawing rollers 122.

Within the drawing chamber there are two pairs of ejectors one of which pairs acts on the gaseous environment in the drawing chamber at a region between the main cooler 115 and the front L-block 113. One ejector 123 of this pair appears in FIG. 12. In fact the ejectors of this pair are located opposite respective opposed edge margins of the ribbon and point in respectively opposite direction across the ribbon path. The second pair of ejectors in the drawing chamber acts on the gaseous environment at a region between the main cooler 116 and the rear L-block 114. The ejectors of this second pair are disposed relative to each other and to the drawing chamber in the same way as the first pair of ejectors acting between the main cooler 115 and the front L-block 113. One of the ejectors 124 of the second pair appears in FIG. 12.

Gas under pressure is supplied alternately to the opposed ejectors of each pair so as to cause displacement of gases across the ribbon path, in the lower part of the drawing chamber, first in one direction and then in the reverse direction. This to-and-fro displacement of gases has the effect of disturbing the normal pattern of convection currents due to the chimney effect of the machine, and of eliminating or reducing the formation of waves in the drawn sheet glass.

The invention is carried out by also discharging gas into the environment of the ribbon through pairs of ejectors disposed on opposite sides of the ribbon path in the lower end of the annealing shaft. One ejector of each of these pairs appears in FIG. 12 and these two ejectors are designated 125 and 126. Ejector 125 is located opposite what, in the view of FIG. 12, is the remote edge margin of the ribbon and points across, the ribbon path. The ejector forming a pair with ejector 125 is located at a higher level in the annealing shaft, opposite the nearer edge margin of the glass ribbon and on the same side of the ribbon as the ejector 125, and points in the opposite direction across the ribbon path. On the other side of the ribbon path and at a similarly higher level there is the ejector forming a pair with ejector 126. These four ejectors are continuously supplied with hot gas so as to cause continuous displacements of gas across the ribbon path on each side thereof and at different levels, the displacements of gas at the different levels taking place in different directions across the ribbon path.

In one specific process performed with the apparatus of FIG. 11, the distance between the upper and lower ejectors in the annealing shaft corresponded with a viscosity interval of $10^{2.5}$ poises. The ejectors were supplied with gas, preheated to 60° C., under a pressure of 350gr/cm². It was found that the displacements of gases in the environment of the ribbon, caused by this operation of the ejectors in the annealing shaft, resulted in the drawn sheet glass becoming substantially free of defects in the form of dark stripes.

Figure 13:
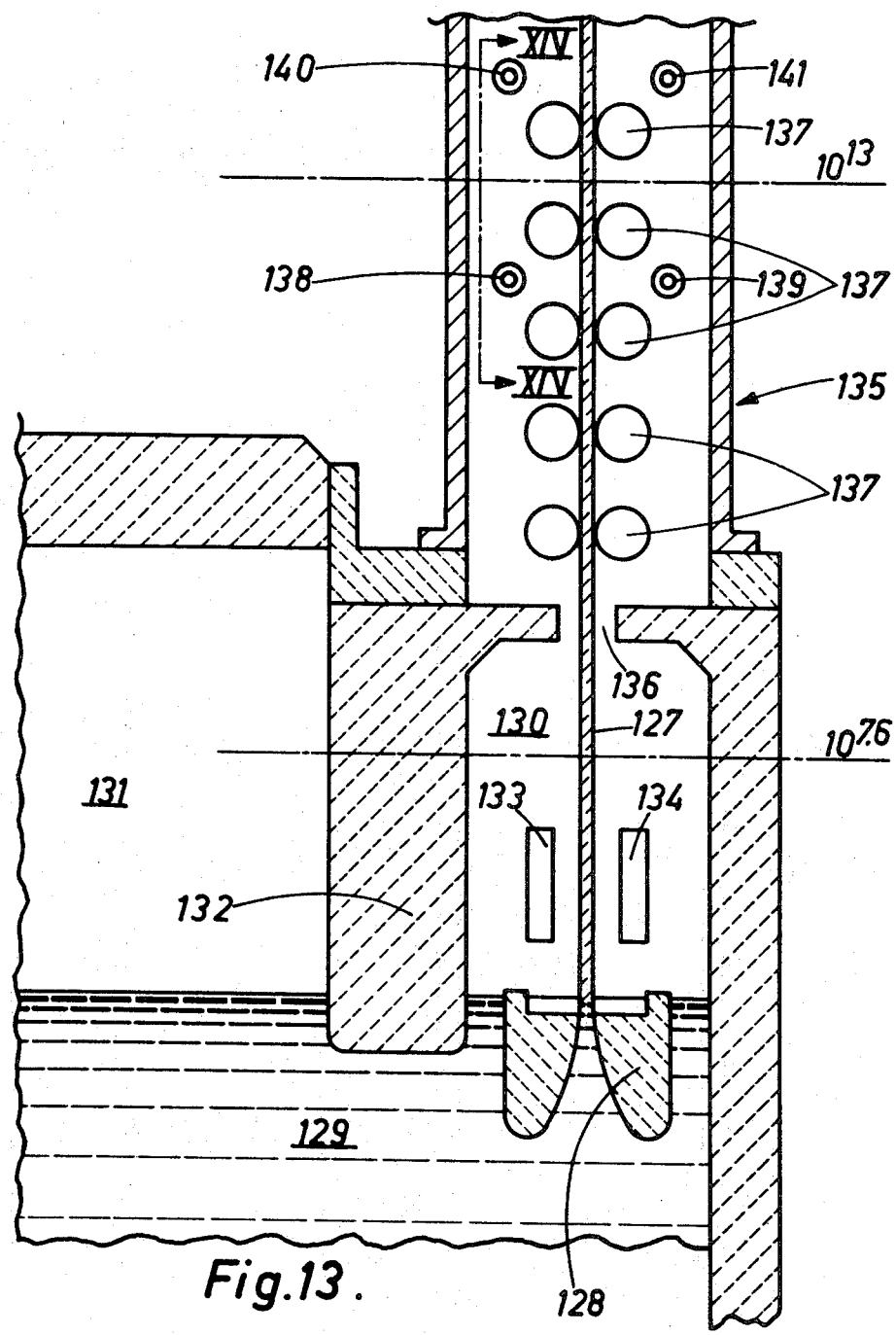
FIG. 13 is a cross-sectional elevational view of part of a Fourcault-type glass drawing machine equipped for carrying out a process according to the invention.
Figure 14:
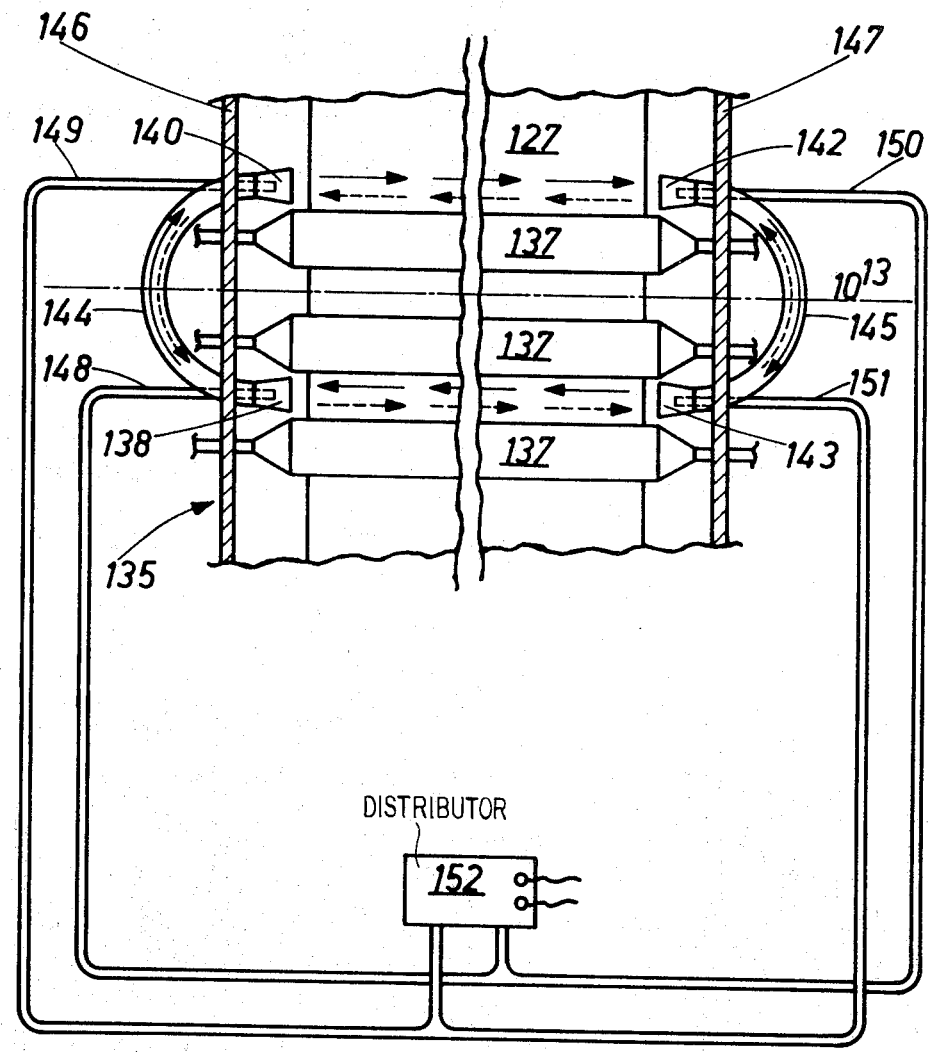
FIG. 14 is a detail elevational view of part of the machine of FIG. 13, the view being in part a cross sectional along line XIV—XIV of FIG. 13.

FIGS. 13 and 14 show the application of the invention to the drawing of sheet glass by the Fourcault process.

In this process, molten glass is extruded upwardly into the ribbon 127 through a debiteuse 128 which is immersed in the molten glass 129. The glass ribbon 127 passes upwardly through a drawing chamber 130, the atmosphere in which is isolated from the atmosphere 131 communicating with the glass-melting furnace (not shown) by a wall 132, the lower portion of which is immersed in the molten glass 129. Within the drawing chamber there are two coolers 133 and 134 located on opposite sides of the ribbon path. The ribbon passes from the drawing chamber into a vertical annealing shaft 135 via a slot 136 in the top wall of the drawing chamber. Within the annealing shaft there are pairs of rollers 137 which are responsible for entraining and guiding the ribbon.

Within the annealing shaft 135 there are two pairs of ejectors for acting on the environment of the ribbon at different levels along its path, on each side thereof. The arrangement of the ejectors which acts on the environment at the front side of the ribbon is clearly apparent from FIG. 14.

For influencing the environment at this side of the ribbon, there are four ejectors 138, 140 and 142, 143. The sleeves or diffusers of the first two of these ejectors are joined by a conduit 144 which extends outside the annealing shaft through the side wall 146 thereof. The diffusers of the other two ejectors 142 and 143 are similarly joined by a conduit 145 which extends outside the annealing shaft through the other side wall 147 thereof. The injection tubes 148 and 149 of the ejectors 138 and 140, and the injection tubes 150 and 151 of the ejectors 142 and 143 are arranged to be supplied with gas under pressure via an automatically controlled distributor 152 which causes operation of the ejectors according to a predetermined cycle.

The four ejectors which act on the gaseous environment at the rear side of the ribbon are relatively disposed and connected to the distributor 152 in precisely the same way as the four ejectors shown in FIG. 14. In other words, the four ejectors which act at the rear side of the ribbon are, in the view of FIG. 14, directly behind the four ejectors shown in that figure and are operated according to the same cycle as those ejectors.

The operating cycle for the ejectors which appear in FIG. 14 is such that in a first period of the cycle gas is discharged through the injection tubes 149 and 151 to operate the ejectors 140 and 143, thereby causing displacements of gases across the ribbon path at the upper and lower levels in the direction indicated by the full-line arrows in FIG. 14. By virtue of the connection of these ejectors, via the conduits 144, 145, with the other ejectors 138 and 142, gases are simultaneously drawn through the sleeves or diffusers of these other ejectors, from the environment of the ribbon, and are guided by the conduits 144 and 145 to the ejectors 140 and 143, respectively. Consequently, in this first period of the cycle, gases are caused to follow a closed substantially oval circuit as indicated by the full-line arrows.

In the second period of the cycle the source of gas under pressure is placed in communication with the injection tubes 148 and 150 so as to operate the ejectors 138 and 142. At the moment when these ejectors commence to be operated, the supply of gas through the injection tubes 149 and 151 is terminated. The circulation of gases therefore takes place in the reverse direction, as indicated by the broken-line arrow, in this second period of the cycle.

During tests using the apparatus of FIGS. 13 and 14, a very considerable improvement in the quality of the sheet glass, assessed in terms of its degree of impairment by dark stripes, was achieved by operating the ejectors in the manner described according to an operating cycle of 45 seconds duration and composed of a first period of circulation of gases in one direction and a second and equal duration period of circulation of gases in the reverse direction.

It was found to be particularly satisfactory to place the ejectors so that the distance between the axes of the upper and lower ejectros corresponded to a viscosity interval of approximately $10^{2.5}$ poises.

It will be understood that the above description of the present invention is susceptible to various modifications, changes and adaptations, and the same are intended to be comprehended within the meaning and range of equivalents of the appended claims.

I claim:

1. A process of manufacturing sheet glass, comprising, in combination: supplying molten glass to a drawing zone; drawing glass from that zone as a continuous ribbon which is guided through subsequent zones in which the glass sets and cools; and exerting, at a first one of a pair of successive locations along the ribbon path, a gas-displacing force which causes gases in the environment of the ribbon to move in one direction across the ribbon on one side thereof, and, at the other one of the pair of locations, a gas-displacing force which causes gases in such environment to simultaneously move in the reverse direction across the ribbon on the same side thereof, the locations being spaced apart along the ribbon path by a distance such that the difference in the viscosities of the glass at the two locations is not more than $10^{2.5}$ poises and at at least one of such locations, the viscosity of the glass is not less than $10^{7.6}$ poises and not more than $10^{13}$ poises.

2. A process according to claim 1 wherein at at least one of the locations of the pair the viscosity of the glass is not less than $10^{10}$ poises.

3. The process according to claim 1 wherein the ribbon of glass is cooled while passing upwardly through a vertical annealing shaft the cross section of which is locally reduced at its bottom to define an entry slot for the ribbon, and at least one of said locations is in said entry slot.

4. A process according to claim 1 wherein the ribbon of glass is cooled while passing upwardly through a vertical annealing shaft the cross section of which is locally reduced at the bottom to define an entry slot for the ribbon, and at least one of said locations is in said vertical shaft.

5. A process according to claim 1 wherein the ribbon of glass is bent over a bending roller preparatory to being advanced through a horizontal annealing shaft, and at least one of said locations is downstream of said bending roller along the ribbon path.

6. A process according to claim 1 wherein said step of exerting is carried out in such a manner that gases which have been displaced in one direction across the ribbon by force exerted at one location of the pair flow within the free environment of the ribbon into a position from which they become displaced in the reverse direction across the ribbon by force exerted at the other location of such pair.

7. A process according to claim 1 wherein said step of exerting is carried out in such a manner that gases which have been displaced in one direction across the ribbon by force exerted at one location of the pair are positively guided into a position from which they become displaced in the reverse direction across the ribbon by force exerted at the other location of such pair.

8. A process according to claim 1 wherein one location of the pair is in the vicinity of one edge margin of the ribbon and the other location is in the vicinity of the opposite edge margin of the ribbon.

9. A process according to claim 1 wherein there are two pairs of such locations, both locations of one pair being in the vicinity of one and the same edge margin of the ribbon, and the other pair being opposite to such one pair and in the vicinity of the opposite edge margin of the ribbon, and the forces acting at the pairs of locations cooperating to bring about said displacements of gases across the ribbon.

10. A process according to claim 1 wherein said step of exerting is carried out so as to displace the gases substantially without increasing the rate of cooling of the glass ribbon.

11. A process according to claim 1 wherein said step of exerting is carried out so that displacements of gases across the ribbon occur only on one side thereof.

12. A process according to claim 1 wherein the gas-displacing forces are exerted periodically at a frequency such that a steady state of the gas currents along the ribbon path does not become established for sufficiently long a period for the quality of the glass to be adversely affected thereby.

13. A process according to claim 1 wherein said step of exerting is carried out so as to cause gas-displacing forces to be exerted periodically and in alternation with forces which act across the same zones along the ribbon path and which reverse the direction of displacement of gases across the ribbon in each of said zones.

14. A process according to claim 13 wherein the exerting of forces which reverse the directions of displacement of gases at such zones are timed to commence no earlier than the relaxation of the forces with which they alternate.

15. A process according to claim 13 wherein such reversal of the directions of displacement of gases across the ribbon takes place at least once every 10 minutes.

16. A process according to claim 1 wherein said step of exerting is carried out at at least one location by blowing gas into the environment of the ribbon at that position.

17. A process according to claim 1 wherein there are two pairs of locations at which forces are exerted which cooperate to cause displacement of gas in one direction across the ribbon in one zone and displacement of gases in a reverse direction across the ribbon in another zone, the forces exerted at one of such pairs of locations being exerted by blowing gas into the environment of the ribbon and the forces exerted at the other of such pairs of locations being suction forces.

18. A process according to claim 1 wherein said step of exerting is carried out at at least one location by mechanical means acting directly on the gaseous environment of the ribbon.

19. A process according to claim 1 wherein the gas-displacing forces causing displacements of gases in at least one direction across the ribbon are also exerted in at least one zone along the ribbon path where the viscosity of the glass is less than $10^{7.6}$ poises.

20. A process according to claim 19 wherein the gas-displacing forces causing displacements of gases in at least one direction across the ribbon are exerted in a lower portion of the zone through which the glass ribbon is drawn and in which it becomes dimensionally set.

21. Apparatus for use in manufacturing sheet glass, comprising, in combination: a drawing chamber; an annealing shaft contiguous with said drawing chamber; means for drawing a continuous ribbon of glass into said drawing chamber from a drawing zone fed with molten glass and for conducting the ribbon along a path extending through said drawing chamber and said annealing shaft; and means for displacing gases across the ribbon by simultaneously exerting gas-displacing forces at a pair of successive locations along the ribbon path, the forces exerted at the different locations of such pair being exerted in respectively opposite directions across the ribbon path so as to cause simultaneous displacement of gases in respectively different directions across the ribbon, said locations being spaced apart along the ribbon path by a distance such that the difference in the viscosities of the glass ribbon at the two locations when the apparatus is in use is not more than $10^{2.5}$ poises and at at least one of such locations the viscosity of the glass when the apparatus is in use is not less than $10^{7.6}$ poises and not more than $10^{13}$ poises.

22. Apparatus according to claim 21 wherein said annealing shaft is a vertical shaft whose cross section is locally reduced at its bottom to define an entry slot for the ribbon, and at least one location of said pair of locations at which said gas-displacing means operates to exert gas-displacing forces is in said entry slot.

23. Apparatus according to claim 21 wherein said annealing shaft is a vertical shaft the cross section of which is locally reduced at the bottom to define an entry slot for the ribbon, and at least one location of said pair of locations at which said gas-displacing means operates to exert gas-displacing forces is in said vertical shaft.

24. Apparatus according to claim 21 further comprising a bending roller about which the glass ribbon is bent preparatory to being advanced through said annealing shaft, which shaft is substantially horizontal, and wherein at least one location of said pair of locations at which said gas-displacing means operates to exert gas-displacing forces is downstream of said bending roller along the ribbon path.

25. Apparatus according to claim 21 wherein said means for displacing gases are so located, and constitute means which exert gas-displacing forces of sufficient magnitude, that gases which have been displaced in one direction across the ribbon by force exerted at one location of said pair flow in the free environment of the ribbon to a place from which they will be displaced in the reverse direction across the ribbon by force exerted at the other location of said pair.

26. Apparatus according to claim 21 wherein said means for displacing comprise guide means disposed for positively guiding gases which have been displaced across the ribbon by force exerted at one location of said pair to a place at which they will be displaced across the ribbon by force exerted at the other location of said pair.

27. Apparatus according to claim 21 wherein one location of said pair is in the vicinity of one edge margin of the ribbon path and the other location of said pair is in the vicinity of the other edge margin of the ribbon path.

28. Apparatus according to claim 21 wherein there are two said pairs of locations, the locations of one said pair being in the vicinity of one edge margin of the ribbon path and the locations of the other said pair being opposite to the one said pair and in the vicinity of the opposite edge margin of the ribbon path, and said gas-displacing means is arranged so as simultaneously to exert gas-displacing forces at the four said locations so that the forces exerted at the four said locations cooperate to bring about displacements of gases across the ribbon path.

29. Apparatus according to claim 21 wherein said gas-displacing means cause displacements of gases across the ribbon path only on one side thereof.

30. Apparatus according to claim 21 wherein said gas-displacing means comprise control means for causing gas-displacing forces at said pair of locations to be exerted periodically across selected zones and in alternation with forces which act across the same zones along the ribbon path and which reverse the direction of displacement of gases across the ribbon path in each of such zones.

31. Apparatus according to claim 30 wherein said control means comprise timing means for causing the exertion of force in one direction across the ribbon path at each of such zones to commence no earlier than the relaxation of force acting in the other direction across the ribbon path at such zones.

32. Apparatus according to claim 21 wherein said gas-displacing means comprise gas blowing means disposed to exert gas-displacing forces by blowing gas into the environment of the ribbon at at least one said location.

33. Apparatus according to claim 32 wherein there are two pairs of locations, said gas-displacing means blow gas into the environment of the ribbon at one said pair of locations, and said gas-displacing means further comprise means for exerting cooperating suction forces at the said pair of locations.

34. Apparatus according to claim 32 wherein said gas-displacing means comprise at least one gas ejector and means for blowing gas into the environment of the ribbon through said ejector.

35. Apparatus according to claim 21 wherein said gas-displacing means comprise a propeller at one said location for exerting one such gas-displacing force.

36. Apparatus according to claim 21 further comprising means for exerting gas-displacing forces across the ribbon path in a lower portion of said drawing chamber.

* * * * *